United States Patent
Matsubayashi et al.

(10) Patent No.: US 7,543,067 B2
(45) Date of Patent: Jun. 2, 2009

(54) FLEXIBLE SECURE NETWORK DATA TRANSFER AND MESSAGING

(75) Inventors: Don Hideyasu Matsubayashi, Monterey, CA (US); Martin Martinez, Huntington Beach, CA (US); Steve Yasuhiro Muto, Irvine, CA (US); Ajit Singh Sodhi, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 853 days.

(21) Appl. No.: 09/919,729

(22) Filed: Aug. 1, 2001

(65) Prior Publication Data

US 2003/0037147 A1 Feb. 20, 2003

(51) Int. Cl.
G06F 15/16 (2006.01)
H04N 7/10 (2006.01)
G06F 17/00 (2006.01)

(52) U.S. Cl. .................... 709/228; 709/207; 709/227; 709/229; 725/32; 725/116; 725/126; 726/1

(58) Field of Classification Search ................. 718/104; 709/207, 223–229; 725/86–88, 90, 95, 96, 725/131, 32, 51, 116, 126; 726/1
See application file for complete search history.

(56) References Cited

U.S. PATENT DOCUMENTS

| | | | | |
|---|---|---|---|---|
| 4,881,263 A | * | 11/1989 | Herbison et al. | 713/162 |
| 5,760,821 A | * | 6/1998 | Ellis et al. | 725/50 |
| 5,802,502 A | * | 9/1998 | Gell et al. | 705/37 |
| 5,822,603 A | | 10/1998 | Hansen et al. | 395/800.01 |
| 5,841,985 A | | 11/1998 | Jie et al. | 395/200.57 |
| 5,854,894 A | | 12/1998 | Lancaster et al. | 395/200.43 |
| 5,905,872 A | * | 5/1999 | DeSimone et al. | 709/245 |
| 5,926,476 A | | 7/1999 | Ghaibeh | 370/395 |
| 5,953,046 A | | 9/1999 | Pocock | 348/12 |
| 5,978,855 A | * | 11/1999 | Metz et al. | 709/249 |
| 6,002,394 A | | 12/1999 | Schein et al. | 345/327 |
| 6,003,090 A | * | 12/1999 | Puranik et al. | 709/235 |
| 6,014,693 A | * | 1/2000 | Ito et al. | 709/219 |
| 6,018,767 A | | 1/2000 | Fijolek et al. | 709/218 |
| 6,041,056 A | | 3/2000 | Bigham et al. | 370/395 |
| 6,124,878 A | | 9/2000 | Adams et al. | 348/10 |
| 6,125,122 A | | 9/2000 | Favichia et al. | 370/466 |
| 6,141,682 A | | 10/2000 | Barker | 709/217 |
| 6,141,689 A | * | 10/2000 | Yasrebi | 709/228 |
| 6,166,730 A | | 12/2000 | Goode et al. | 345/327 |
| 6,173,322 B1 | * | 1/2001 | Hu | 709/224 |

(Continued)

*Primary Examiner*—Ario Etienne
*Assistant Examiner*—Lashanya R Nash
(74) *Attorney, Agent, or Firm*—Fitzpatrick, Cella, Harper & Scinto

(57) ABSTRACT

The present invention is directed to the use of a messaging component for sharing a common network communication channel by a plurality of threads of execution. The messaging component receiving a message and forwarding the message to one or more of the threads using information in a payload portion of the message, which is compared with supplied registration information. In addition, according to the present invention, messaging and job components may be used by each of a plurality of execution threads to negotiate a manner of transferring data between two network computers, wherein the job component proposes a manner of transfer, which is communicated using the messaging component to a receiving a computer. The proposed manner of transfer may be accepted or rejected by the receiving computer. An alternative manner of transfer may be proposed, where another manner of transfer is found to be unacceptable.

7 Claims, 15 Drawing Sheets

U.S. PATENT DOCUMENTS

| | | | |
|---|---|---|---|
| 6,181,940 B1 | 1/2001 | Rune | 455/435 |
| 6,184,878 B1 | 2/2001 | Alonso et al. | 345/327 |
| 6,188,871 B1 | 2/2001 | Kitamura et al. | 455/6.1 |
| 6,195,797 B1 * | 2/2001 | Williams, Jr. | 725/74 |
| 6,202,157 B1 * | 3/2001 | Brownlie et al. | 726/1 |
| 6,279,041 B1 * | 8/2001 | Baber et al. | 709/232 |
| 6,389,462 B1 * | 5/2002 | Cohen et al. | 709/218 |
| 6,477,586 B1 * | 11/2002 | Achenson et al. | 719/330 |
| 6,594,826 B1 * | 7/2003 | Rao et al. | 725/95 |
| 6,598,068 B1 * | 7/2003 | Clark | 718/104 |
| 6,697,862 B1 * | 2/2004 | Beser et al. | 709/226 |
| 6,754,714 B1 * | 6/2004 | Chebrolu | 709/229 |
| 7,065,579 B2 * | 6/2006 | Traversat et al. | 709/230 |
| 7,174,563 B1 * | 2/2007 | Brownlie et al. | 726/1 |
| 2002/0100059 A1 * | 7/2002 | Buehl et al. | 725/116 |
| 2002/0107966 A1 * | 8/2002 | Baudot et al. | 709/227 |
| 2002/0120665 A1 * | 8/2002 | Alford et al. | 709/107 |

* cited by examiner

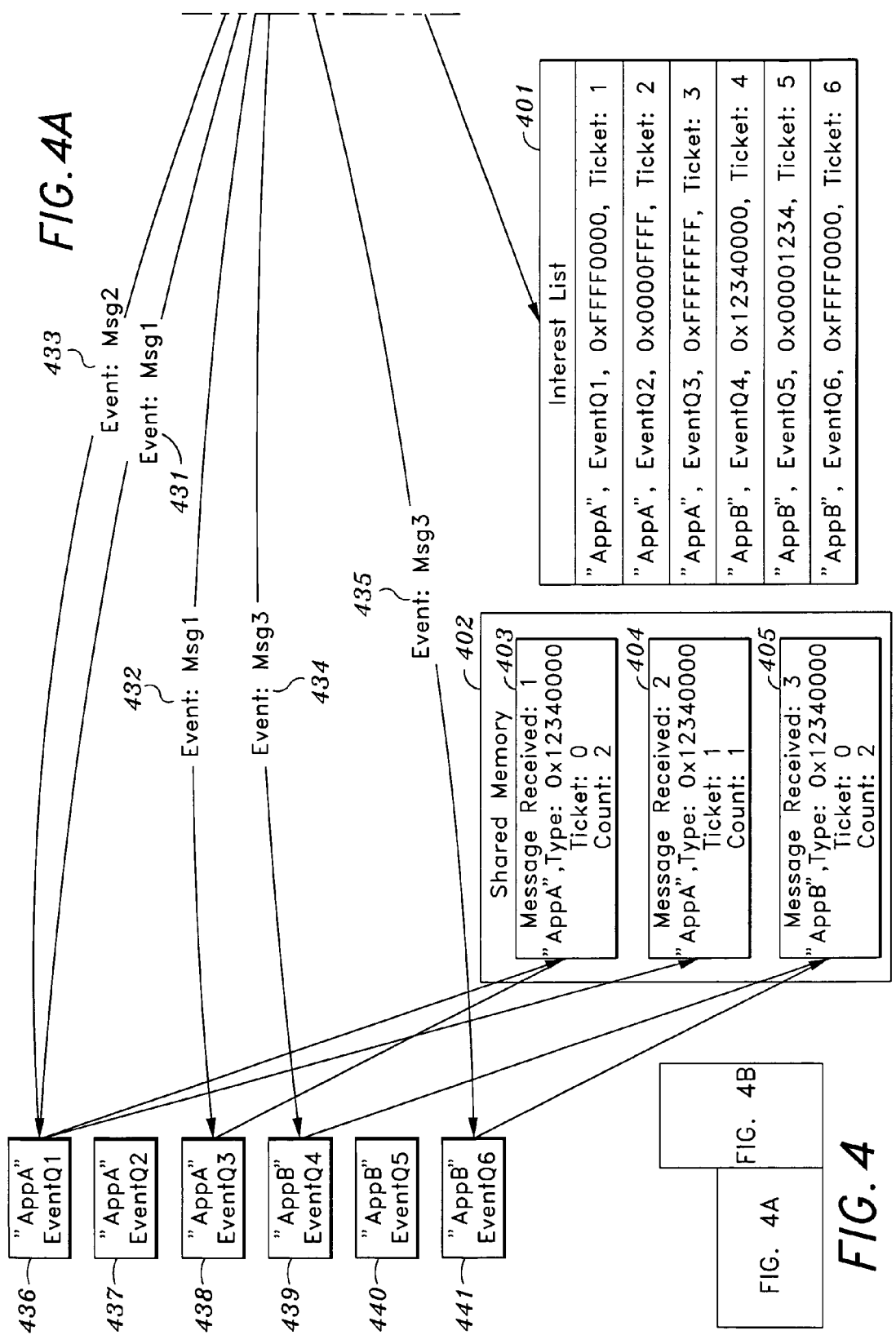

FLEXIBLE SECURE NETWORK DATA TRANSFER AND MESSAGING

BACKGROUND OF THE INVENTION

1. Field of the Invention

The present invention relates to the transmission of data and messages via a network, and more particularly, to a system and method that provides for the flexible and secure transfer of data and the use of a messaging component as a common network connection for access by execution threads to the network, and for determining a manner of transferring data.

2. Description of the Related Art

Most homes presently have at least one television that is connected to a digital cable network that transports signals representing broadcast network and/or cable premium channels as well as other types of programming such as pay-per-view movies or special event programming to one or more televisions within the home.

Some of the signals that are transmitted to the home via the digital cable network, such as premium and pay-per-view signals, are scrambled. In order to view these signals unscrambled, the television is connected to the digital cable network via a box, referred to as a set-top box (STB) that unscrambles the signals. In addition to the STB, the digital cable network also typically includes at least one Cable Head End (CHE) computing system that interacts with the STB.

Since the STB is coupled to the digital cable network and the CHE, it would be beneficial to be able to run application, or program code, on the STB and to allow the application to communicate with an application executing on another computing system such as the CHE via the digital cable network. While the CHE may be a computing system with ample resources for executing application software, the STB has traditionally been limited in its computing resources. Since there are drawbacks (e.g., cost) associated with upgrading the STBs, it would be beneficial for program code that executes on an existing STB to be able to access other computing systems via the digital cable network.

Many currently available STBs, such as those available from Scientific Atlanta, have one or more connectors (e.g., a USB connector) for physically connecting an external device to the STB. Examples of devices that may be connected to the STB include, but are not limited to, printers, image capture devices such as a digital still or video camera, scanner, etc.

In commonly-assigned U.S. patent application Ser. No. 09/723,976, entitled "Digital Image Retrieval and Storage", which was filed on Nov. 28, 2000 and is incorporated herein by reference in its entirety, a STB executes a driver which interfaces with a device connected to the STB. Briefly, the STB identifies a driver for use with a device currently connected to the STB, the driver executes on the STB for interfacing with the device. In the case of an image capture device, for example, an appropriate driver executing on the STB may be used to retrieve a digital image from the device for upload to a computing system such as a CHE via the STB.

In a case that a printer is connected to the STB, the STB might be used to download print data for printing by the printer via the STB. In such a case, code executing on the STB would receive the print data and forward it to the printer.

An application that executes on the STB may need to retrieve data from the CHE or other server. For example, the STB may execute a "deli" application that displays a menu of foods for take out or delivery. By downloading the menu, the deli application executing on the STB is able to keep the food offerings current.

FIG. 1 illustrates an architecture designed by Scientific Atlanta for use in a digital cable network environment, wherein software that is used to control the digital network, referred to as Digital Network Control System (DNCS) 103, includes a pass-through messaging mechanism for communication between CHE 101 and STB 102.

The pass-through messaging mechanism of DNCS 103, known as DSM-CC Pass-Thru messaging (not shown), passes messages from CHE 101 to STB 102. In order to send a message from CHE 101, a transport service connection is established. A transport service, which is a service that is provided by the transport layer of a network communication protocol stack to higher protocol stack levels (e.g., session and application layers), may be connection-oriented or connectionless.

With a connection-oriented transport service, a connection is established between end points, which remains in existence until it is closed. The Transport Control Protocol (TCP) is an example of a transport layer communication protocol that is connection-oriented. In contrast to a connection-oriented service, in a connectionless service, a dedicated connection that remains open until it is closed does not exist. The User Datagram Protocol (UDP) is an example of a connectionless communication protocol.

Both a connection-oriented and a connectless transport service have associated transport primitives (or operations) to access the service. One such primitive is a socket primitive. The socket primitive is used to create a socket, which is a communication end point, so that process 108 of application 106 running on CHE 101 can send a message to thread 117 of STB 102. Information that is passed to the socket primitive includes quality of service information (e.g., reliability, stream versus byte transmission) as well as a communication protocol (e.g., TCP or UDP).

Both a TCP message and a UDP datagram include an Internet Protocol (IP) header that contains a destination address as well as a source address. Source and destination addresses in an IP header include an IP address and either a TCP or a UDP header identifier that is referred to as a port number. The combination of an IP address and a port number corresponds to a socket.

In addition to being either connection-oriented or connectionless, a socket may be bi-directional. When a socket is configured for TCP, it is connection-oriented, and it provides a reliable end-to-end data stream. In contrast, when the socket is configured for UDP, it is connectionless and there is no assurance of data delivery.

Application 106 running on CHE 101 may include multiple processes and/or subprocesses that communicate with STB 102. For example, process 108 may forward a message to thread 117 executing on STB 102. A message originating from process 108 may be sent, via TCP socket 112A, to DNCS 103. DNCS 103 forwards the message to STB 102 via UDP socket 113. The message is then forwarded to thread 117 via digital cable network 105. QPSK (Quadrature Phase-Shift Keyed) 104 uses a digital frequency modulation technique for sending data over a coaxial cable network. The coaxial cable network comprises a fiber optic cabling connecting hubs 127. Fiber optic cabling is also used to connect hub 127 to one or more nodes 129, which may in turn be connected to one or more STBs 102 using coaxial cabling.

DNCS 103 determines whether the message was sent to STB 102, and notifies the sending process 108 accordingly via Transport Control Protocol (TCP) connection 112A.

Using this architecture, each thread, process and/or application executing on CHE 101 must establish a separate connection to DNCS 103 in order to communicate with a STB application or thread. That is, each process and subprocess, or thread, that uses the pass-through mechanism of DNCS 103 must establish a separate TCP connection.

Thus, for example, separate TCP sockets (e.g., sockets 112A and 112B) are needed for both processes 108 and 109 to communicate with thread 117.

The DNCS listens on a well-known port for a connection request originating from CHE 101. Upon receipt of such a request, another socket is created, in addition to the well-known port's socket, to communicate with the requestor. In addition to the DNCS, other servers, such as a File Transfer Protocol (FTP) server, open a second port in response to a message received via the first, well-known port.

However, the well-known port approach does not aid in reducing the number of sockets used, since each application, process or thread on CHE 101 that uses pass-thru messaging must have its own socket on DNCS 103.

Alternatively, it might be possible to reduce the number of ports and use shared memory to store messages that may be retrieved by a message recipient. One concern with this approach has to do with security, since any application, process or thread which has access to the shared memory has access to the messages and data stored in shared memory. This is especially of concern if the message contains sensitive information such as financial or other information.

The number of needed ports may be reduced by dynamically creating a port such as is done with a well-known port. However, there are security concerns with this approach as well. It is possible that the port creator (e.g., an FTP server), is not trusted, or cannot be verified, and may be impersonated by another that has placed itself in the port creator's position. In so doing, the impersonator can control the messaging and at a very least monitor messages intended for the second port.

In addition to the problems just discussed with the architecture shown in FIG. 1, there is no ability within the architecture to select a method of transport based on considerations associated with CHE 101 and/or STB 102.

Such considerations include whether the data that is to be sent via the network is to be encrypted and/or sent via a secure communications channel. It may be desirable to use bi-directional communication and/or a connection-oriented communications channel.

It would also be beneficial to be able to take into account the current load of CHE 101, or a server that is being used to transfer data. For example, where one server is currently very busy servicing requests, if there is another less busy server that is able to service a request, it would be beneficial to be able to suggest that the request be serviced by the other server. That is, it would be beneficial to be able to perform load balancing across servers used to service requests.

Therefore, it would be beneficial to have an ability to negotiate a manner of communicating via a network so that needs and capabilities of the client STB and a server such as the CHE may be taken into account. Generally, it would be beneficial to have a mechanism for messaging and data transfer, via a network, that is flexible as well as secure.

SUMMARY OF THE INVENTION

The present invention provides a method, for use in a network, of using a messaging component and a single network communication channel (e.g., a connection-oriented or connectionless communication channel) for sending and receiving messages by a plurality of threads of execution executing on a network computer, the method comprising establishing, on the network computer, a network communication channel for use by the messaging component, the network communication channel having a network address, supplying registration information associated with each of the plurality of execution threads executing on the network computer, receiving a message at the network computer by the messaging component, the message containing the network address of the messaging component, the message further containing a payload portion for identifying one or more of the execution threads, the messaging component comparing the contents of the payload portion with the registration information for each of the plurality of execution threads, and forwarding the received message to the one or more execution threads based on the results of the comparison.

Thus, the execution threads may use a single, shared network communication channel for sending and transmitting messages via the network. In so doing, it is possible to conserve resources of the network computer that would otherwise be allocated to the separate communication channels used by each thread.

In another embodiment of the invention, a method is provided, for use by a network computer system executing a messaging component and a plurality of execution threads, for determining a manner of transferring data to a recipient network computer system, the messaging component having a network address and configured to receive and send network messages for the plurality of execution threads, the method comprising, receiving a request from one of the execution threads to transfer data to the recipient network computer, the request including at least one requirement for carrying out the request, based at least in part on the received requirement, determining a proposed manner of transfer, transmitting, using the messaging component, a start message to the recipient network computer, the start message including the proposed manner of transfer, in response to a rejection of the proposed manner of transfer, determining whether an alternative manner of transfer is available, and responding to the rejection with an alternative manner of transfer where one is available.

Yet another embodiment of the invention concerns a method of communicating between a set-top box and a cable head end via a digital cable network, the method comprising establishing a common network communication channel on one or the other or both the set-top box and the cable head end, wherein the common network communication channel is shared by a plurality of applications, or execution subprocesses thereof, to send and receive messages via the digital network.

This brief summary has been provided so that the nature of the invention may be understood quickly. A more complete understanding of the invention can be obtained by reference to the following detailed description of the preferred embodiment(s) thereof in connection with the attached drawings.

DETAILED DESCRIPTION OF THE PREFERRED EMBODIMENTS

Figure 1:
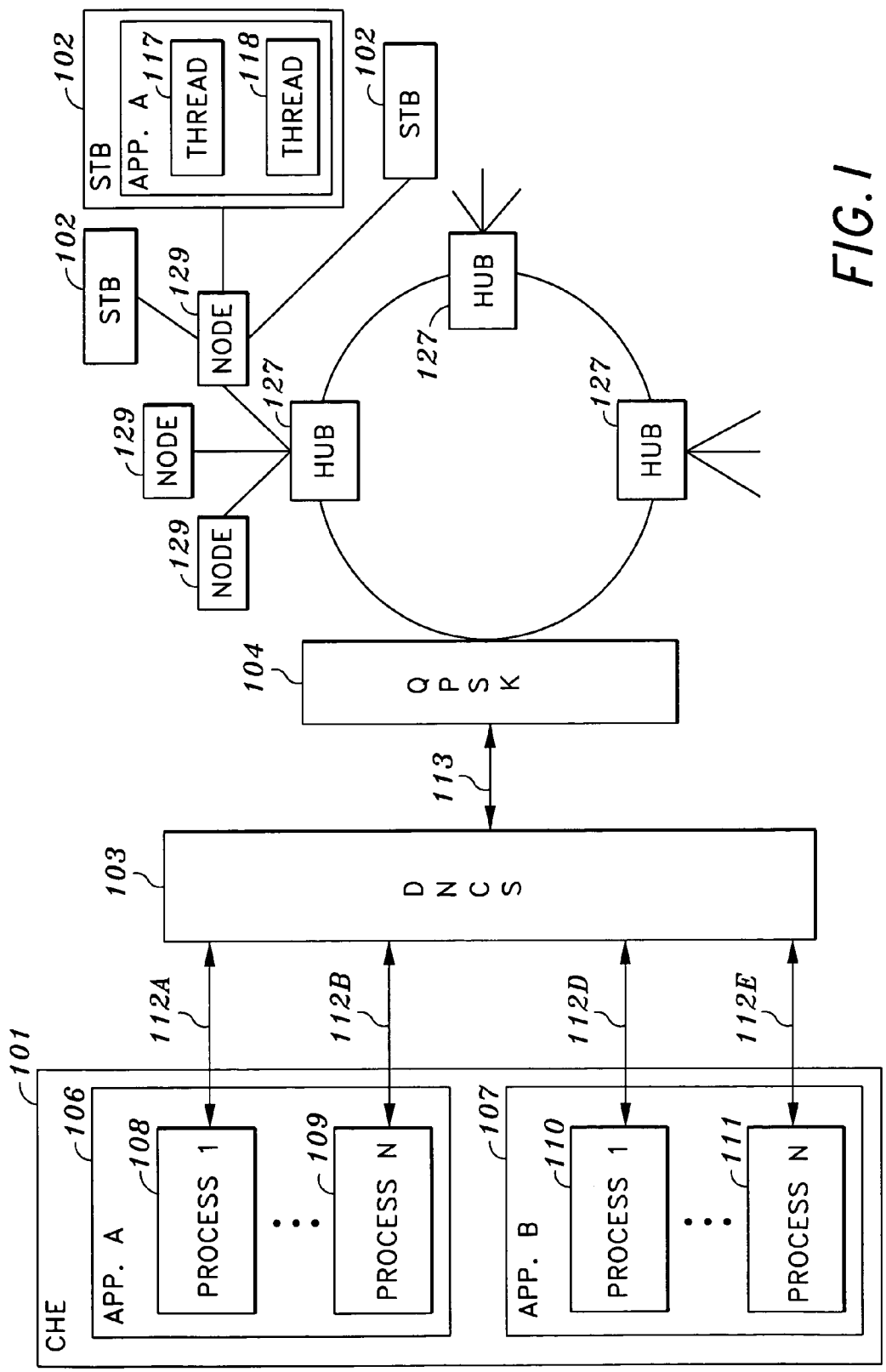
FIG. 1 provides an example of a communication architecture for use in a digital cable network environment.
Figure 2:
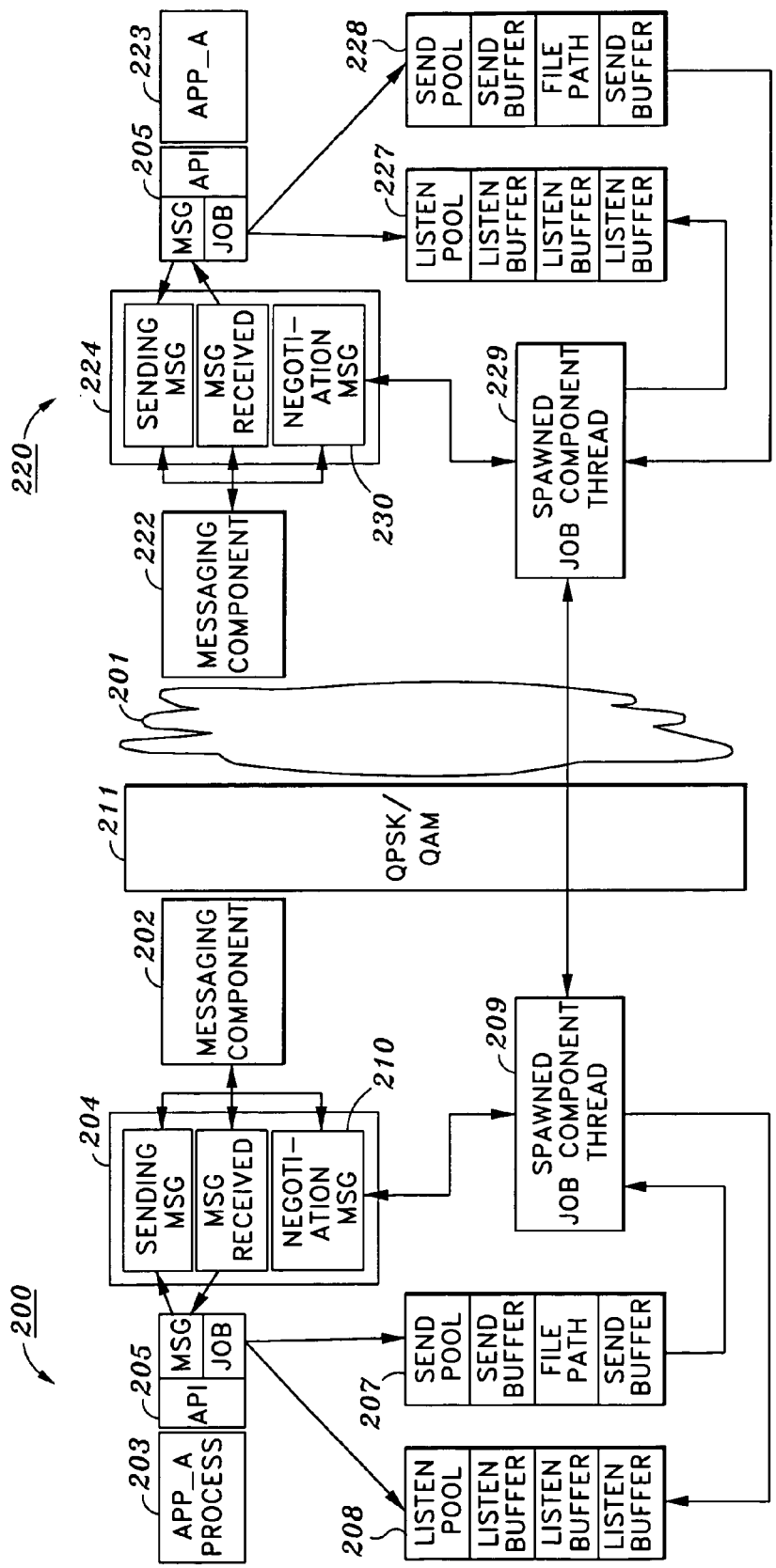
FIG. 2 is an overview of a communication architecture according to the present invention.

FIG. 2 is an overview of a messaging architecture according to the present invention, which is described with reference to a digital cable network 201. However, it should be apparent that other networks, including the internet, may be used with the present invention. According to the present invention, a messaging component executes on a sender, a receiver, or both to provide a shared connection to coaxial network 201.

In the example of FIG. 2, a messaging component 202 operates to provide a shared communication channel to network 201 on a cable head end (CHE) 200, which can be a personal computer, for example. The communication channel may be of a connection-oriented or connectionless type, and the term connection as it is used herein refers to either type.

Figure 3:
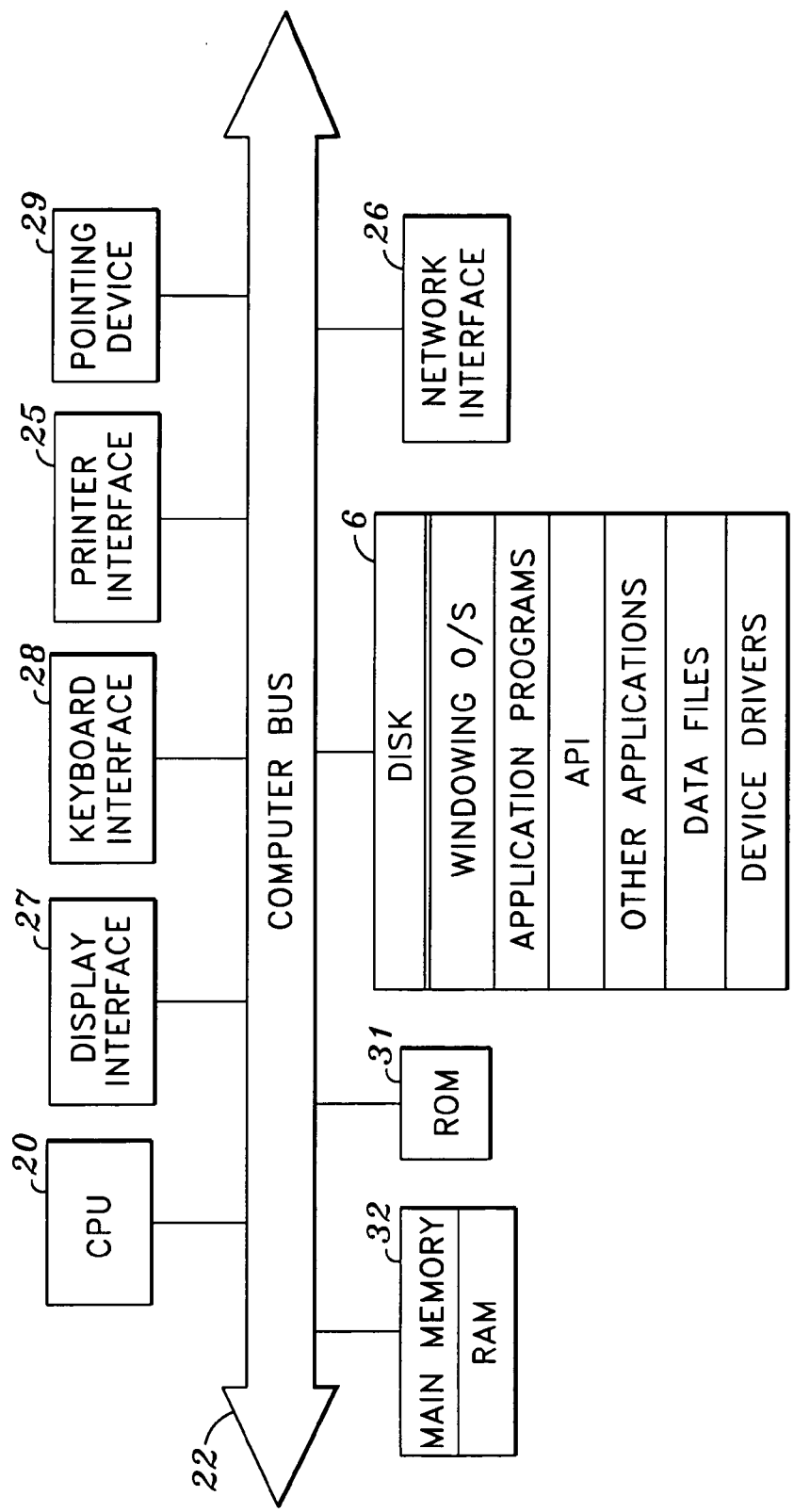
FIG. 3 is a block diagram of the internal architecture of a personal computer for use in conjunction with the present invention.

FIG. 3 provides an example of a block diagram of the internal architecture of a personal computer for use as CHE 200 in conjunction with the present invention. Shown in FIG. 3 is CPU 20, which interfaces to computer bus 22. CPU 20 may be a Pentium-type microprocessor, a SPARC microprocessor, or a Motorola microprocessor, for example. Also interfaced to computer bus 22 are printer interface 25, to allow CHE 200 to communicate with a printer, network interface 26 to enable communications between CHE 200 and network 201, display interface 27 for interfacing with a display monitor, keyboard interface 28 for interfacing with a keyboard, and mouse interface 29 for interfacing with mouse.

Read only memory (ROM) 31 stores invariant computer-executable process steps for basic system functions such as basic I/O, start up, or reception of keystrokes from the keyboard.

Main random access memory (RAM) 32 provides CPU 20 with memory storage which can be accessed quickly. In this regard, computer-executable process steps of a messaging component as well as other applications and an API for interfacing between the messaging component and the applications are transferred from disk 6 over computer bus 22 to RAM 32 and executed therefrom by CPU 20.

Also shown in FIG. 3 is disk 6 which includes a windowing operating system, and one or more applications which may include an application which uses the messaging component of the present invention to communicate over the network. Other applications may include browser, word processing, spreadsheet, graphics and gaming applications. Disk 6 further includes data files and device drivers as shown.

Referring again to FIG. 2, messaging component 202, which executes on CHE 200, operates to allow one or more processes to communicate with other computing systems. Unless indicated to the contrary, the term process is used herein to refer to a thread of execution (e.g., an application, a process, subprocess, thread, etc.) that executes on a computing system.

The computing system with which CHE 200 communicates in the example of FIG. 2 is set top box (STB) 220. STB 220 may be one of the STBs available from Scientific Atlanta as well as another type of STB. Another computing system, other than STB 220, may be used with the present invention and communicate with CHE 200 such as another personal computer. Messaging component 222 executes on STB 220 to provide a shared connection to network 201 for threads of execution that execute on STB 220, in which all threads of execution execute at the thread level. In such a case, messaging component 222 and application 223 have access to the same memory space.

On CHE 200, an application may execute in a process (e.g., process 203), or processes, and messaging component 202 also executes as a process. In such a case, shared memory may be used so that two or more processes have access to the same memory, and can communicate via data that is stored in the shared memory. For example, shared memory may store event queue 204 for access by messaging component 202 and application process 203. In addition, application programming interface (API) 205 provides functionality available to both process 205 and messaging component 202.

Buffers 207 and 208 store information (e.g., send and receive data) used in a data transfer between CHE 200 and STB 220. Event queue 204, are used to provide notification that an event (e.g., send message event, message received event, and/or negotiation message event) has occurred. Information associated with sending a message (e.g., recipient's address and a handle to the message to be sent) may be communicated to messaging component using API 205.

QPSK/QAM 211 is used by messaging component 202 to send and receive messages and data over network 201.

Messaging component 222, which executes as a thread on STB 220 provides a shared connection to network 201. Event queue 224 provide notification that a message is to be sent by messaging component 222, that a message has been received by messaging component 222, and/or a negotiation message is to be sent or has been received. When application 223, which executes at the thread level on STB 220, receives a notification in event queue 224 that a message has been received, it accesses the stored message using the handle provided by the event. Conversely, when a message is to be sent, application 223 places an event in event queue 224 to notify messaging component 222 that a message is to be sent. As a result of the notification, messaging component 222 retrieves the message from storage for transmission using its connection to network 201. As on CHE 200, API 205 provides a programming interface, and functions, for interfacing between the messaging component (e.g., messaging component 222) and a thread of execution (e.g., application 223, or spawned threads 209 and 229).

Negotiation messages 210 and 230 negotiate a manner of transferring data. To negotiate a manner of transfer, threads 209 and 229 are spawned on CHE 200 and STB 220, respectively. Threads 209 and 229, also referred to herein as job components, negotiate a manner of transfer via negotiation messages 210 and 230 using messaging components 202 and 222. While a job component is preferably a thread, a job component may be other than a thread (e.g., a process).

Where the manner of transfer is a direct connection, once a manner of transfer is determined, threads 209 and 229 can communicate directly to transfer the data. In a case that data is transferred from STB 220 to CHE 200, application 223 uses buffers 228 to buffer data that is to be sent to CHE application 203, and buffers 208 are used to store data received from application 223. In a case that data is transferred from CHE 200 to STB 220, buffers 207 store data to be sent and buffers 227 store data received from application 203.

Negotiation messages 210 and 230 are also used to negotiate a "by reference" data transfer. In such a case, the recipient receives a location (e.g., a universal resource location, or URL) of the server on which the data resides, and makes a connection with the server to retrieve the data.

According to the present invention, messages are sent using a network communication such as Internet Protocol (IP), and messages of the present invention are sent as payload of an IP network message. An IP header includes a network address of the source and destination, which comprises an IP address and may include a port designation associated with a socket. Alternatively, the network address may comprise a MAC address, or a Network Access Service Point (NSAP).

For example, the IP header includes a network address (e.g., IP address and port designation) for both CHE 200 and STB 220. The network address of CHE 200 includes its IP address and the port designation associated with messaging component 202 executing thereon. Similarly, the network address of STB 220 includes its IP address and the port designation associated with messaging component 222.

In addition, according to the present invention, the payload portion of the network message includes information that is used to identify the intended recipients of the message (e.g., application process 203 or application thread 223). The addressing information stored in the payload of the network message comprises a name of the application to which the message is to be sent as well as a type designation. The application name and type designation(s) are used by a messaging component (e.g., messaging component 202 and/or messaging component 222) to identify an intended recipient (i.e., a thread of execution) of a message. The name is associated with an application's registered name, and the message type is compared with registered interests to match a received message to the registered interests of execution threads of the application. In addition, a network message may include a ticket designation that explicitly identifies a message recipient.

Figure 4B:
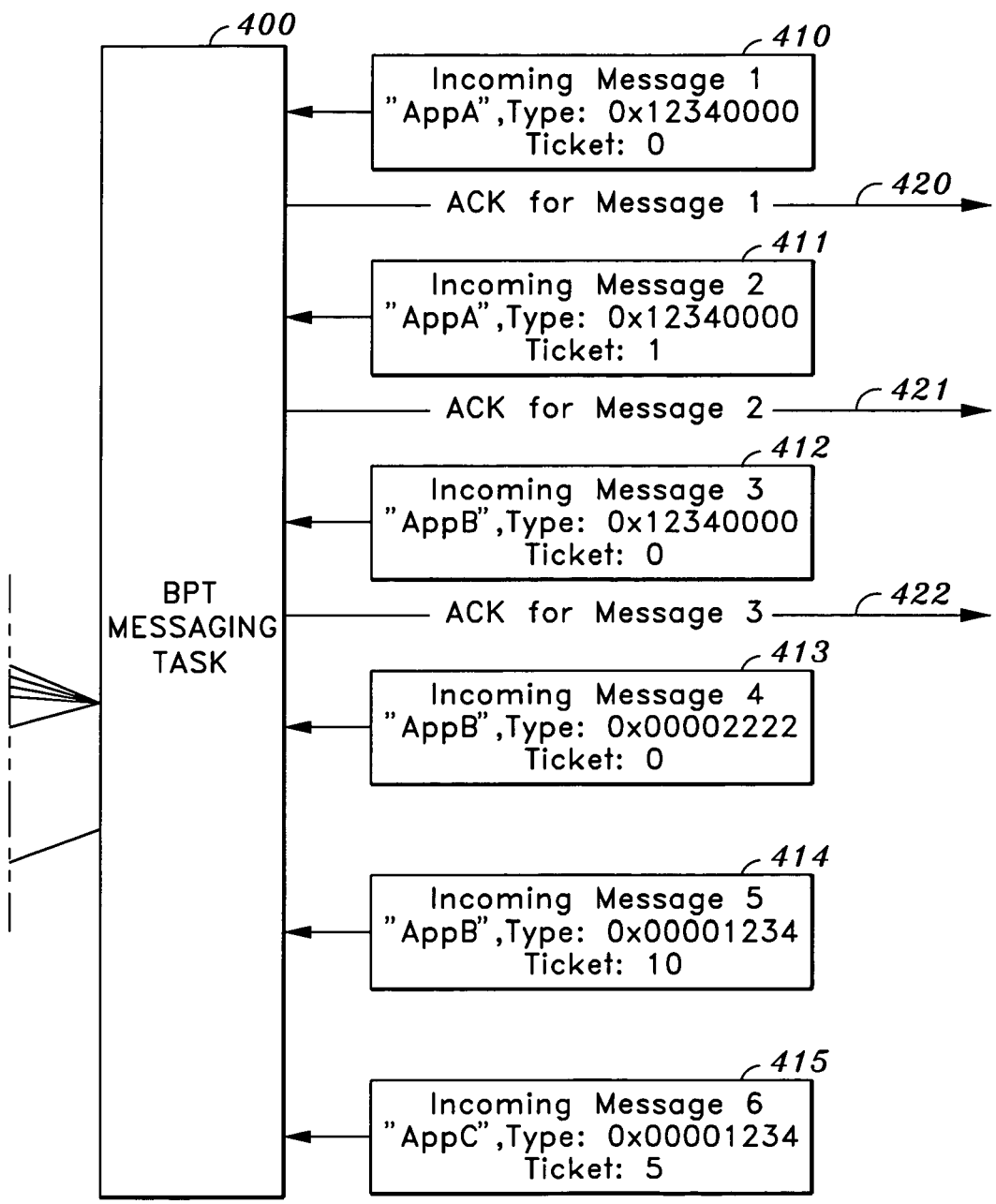
FIG. 4 provides examples of using the addressing portion of a network message's payload according to the present invention.

FIG. 4 provides examples of using the addressing portion of a network message's payload according to the present invention. Messaging component 400 may be messaging component 202 or messaging component 222. Messages 410 to 415 are received from network 201, and messages 420 to 422 are transmitted via network 201 as responses to messages 410 to 412, as part of a network message of network 201. In addition to a source address, the header portion of the network messages included a destination address comprising a port designation associated with messaging component 400 and an IP address of the computing system on which messaging component 400 executes. Similarly, messages 420 to 422 include a destination network address and a source address that identifies messaging component 400 and its computing system.

When message 410 is received, messaging component 400 uses the addressing information (i.e., in the payload portion of the network message that contained message 410) therein to identify the intended recipients. Message 410 includes a name of an intended application (i.e., "AppA"), a message type (i.e.,"0x12340000"), and no ticket designation. Messaging component 400 refers to interest list 401, which includes interests registered by threads of execution of an application to identify the intended recipients. For example, each entry of interest list 401 includes a name of the application to which it belongs as well as an event queue and interest. In addition, each entry includes a ticket that uniquely identifies the thread of execution to messaging component 400. For example, a ticket may comprise a thread ID assigned by the computing system's operating system, or a combination of a thread ID and a process ID.

In a case that no ticket is designated, to identify a recipient, messaging component 400 compares the message type with an interest associated with each entry associated with "AppA". Preferably, the comparison performs a logical (e.g., an "AND") operation using the message type and the interest designation. If the message type and the interest designation match (i.e., the result of a logical "AND" operation is "TRUE"), the thread of execution associated with the entry in interest list 401 is determined to be an intended recipient.

Thus, as a result of an "AND" operation using "0x12340000" and "0xFFFF0000", messaging component 400 places a "message received" event (i.e., event 431) in event queue 436, which is associated with the thread of execution of "AppA" that created the first entry in interest list 401. The event includes a pointer to the storage location of the received message (e.g., a pointer to entry 403 of shared memory 402. The thread of execution in turn uses the pointer to access the message. In addition, since a "TRUE" (e.g., in a binary representation, a "TRUE" is usually represented as a "1", or a string of "1s") results from an "AND" operation of "0x12340000" and "0xFFFFFFFF", event 432 is placed in event queue 438. As part of a guaranteed delivery mechanism of the present invention, messaging component 400 sends "ACK" message 420 to the sender, which indicates that message 410 was received, was considered valid, and one or more recipients have been identified for message 410.

When message 411 is received, messaging component 400 determines that it includes a ticket designation. Thus, after comparing the message type to interests included in entries of interest list 401 to determine an intended recipient, messaging component 400 compares the ticket in message 411 with a ticket designation in the entries of interest list 401. Since message 411 has the same ticket as entry number 3, another event (i.e., event message 433) is placed in event queue 436. The event notifies the corresponding execution thread that message 411 has been received and is located in shared memory 402 (e.g., entry 404 of shared memory 402). A message (i.e., "ACK" message 421) is sent by messaging component 400 to the sender indicating that a valid message was received and that at least one recipient was identified for the message. Thus, the ticket designation in message 411 can be used to directly address an execution thread, and to limit the message delivery to only those recipients with the same registered ticket as that included in the message.

Message 412 has the same interest designation as message 410, and message 411. However, message 412 specifies an application name that is different than the application specified in messages 410 and 411. Since message 412 identifies "AppB", messaging component 400 compares entries in interest list 401 associated with "AppB" to identify whether or not there are any intended recipients. Messaging component 400 compares the message type "0x12340000" with the entries associated with "AppB". As a result, events 434 and 435 are placed in event queues 439 and 441, respectively, by messaging component 400.

Each entry in shared memory 402 corresponds to a message for which messaging component 400 found at least one recipient. Messaging component 400 associates a count with each entry that initially identifies the number of recipients that messaging component 400 found for the received message. A recipient can free the message, which results in the message's count being decremented. Once the count is zero, messaging component 400 frees the space used for the message in shared memory 402.

In addition to the count, each entry in shared memory 402 includes a ticket designation. Messages 410 to 412 include a ticket associated with the thread of execution from which each message was sent. If a recipient thread of execution wishes to send a message to the sender, the recipient can use the ticket to designate that the sender is to receive the message. In contrast, if the ticket of the sender of the first message is not used, all of the recipients who have a compatible interest will receive the second message.

Messages 413 to 415 are also received by messaging component. However, messaging component 400 determines that none of the threads of execution that are registered with messaging component have a compatible registered interest. For example, message type "0x00002222" of message 413 is compared with "AppB" entries, and interests "0x12340000", "0x00001234" and "0xFFFF0000" result in a "FALSE" result. Even though message 414 has a message type (i.e., "0x00001234") that is compatible with registered interests of threads of execution of "AppB", messaging component 400 does not identify an intended recipient, since none of the registered tickets are the same as the ticket in message 414 (i.e., "10"). Finally, since "AppC" does not have any registered threads of execution, messaging component 400 finds no intended recipients for message 415. In each of these circumstances, no "ACK" message is returned by messaging component 400 to the sender(s).

According to the present invention, a message sent by a thread of execution may be sent to multiple recipients using the application name and interest combination. The sender also includes its ticket in order for a responding thread of execution to direct a response to the sender. The message may be request for a service (e.g., data transfer). If a recipient thread of execution elects to respond to the sender, it generates a response which designates the sender using the sender's ticket and includes the responding execution thread's ticket. In so doing, the sending and responding threads of execution may communicate one-on-one with each other.

Figure 5:
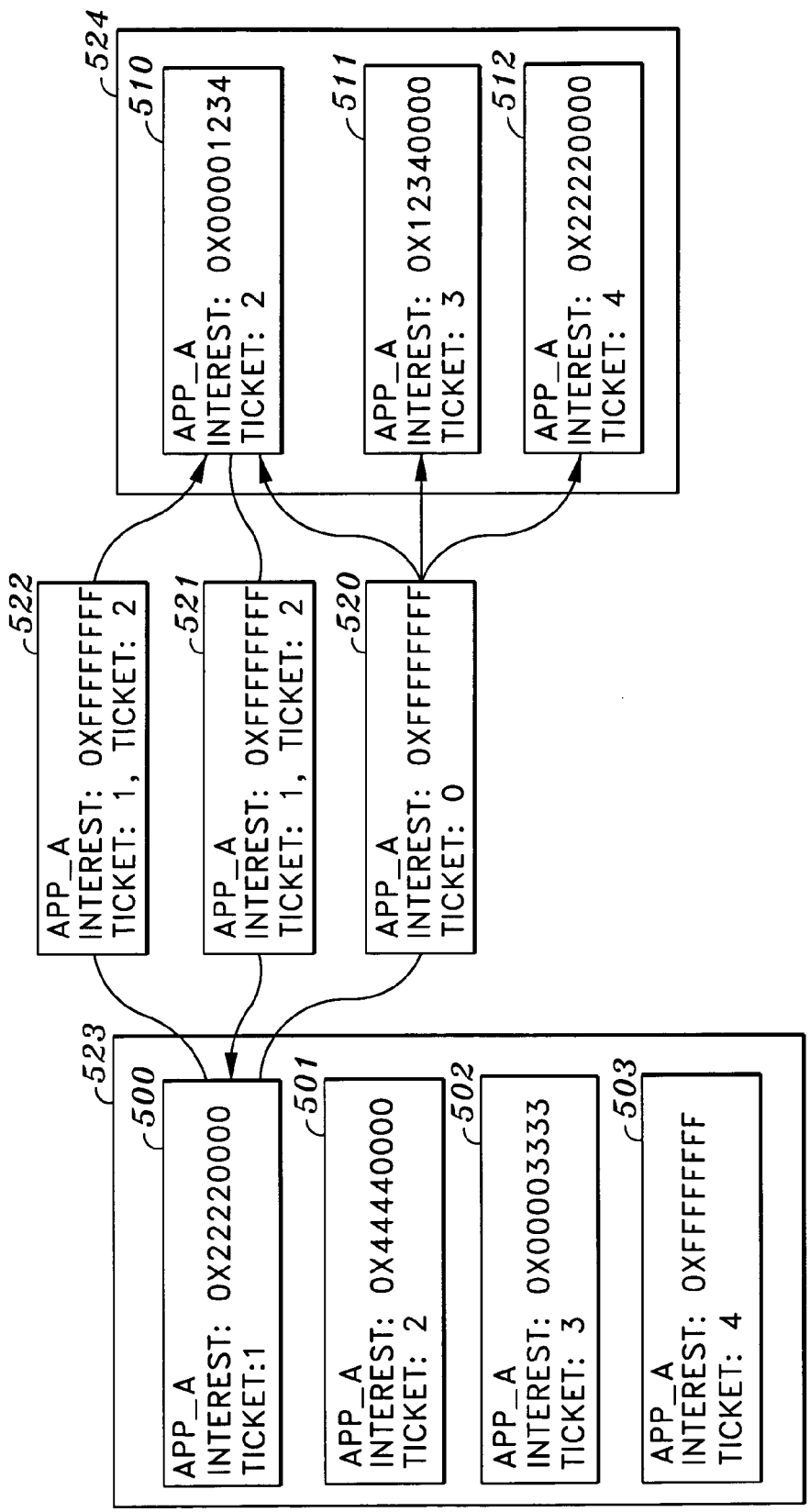
FIG. 5 illustrates sending and receiving messages, and the use of acknowledgments according to the present invention.

FIG. 5 illustrates multicasting using the application name and interest combination and addressing a specific recipient using a ticket according to the present invention. Threads of execution 500 to 503 are executing on computing system 523, and threads of execution 510 to 512 are executing on computing system 524. Although not shown, messaging component 400 runs on both computing system 523 and 524.

Using messaging component 400, execution thread 500 sends a multicasting message 520 using a multicasting interest designation (e.g., "0xFFFFFFFF"), which matches the registered interest(s) of each of execution threads 510 to 512. Message 520 includes execution thread's 500 ticket, but does not designate a ticket of a recipient. As a result, execution threads 510 to 512 each receive message 520. Execution thread 510 decides to respond, and sends message 521, which includes execution thread's 500 ticket and execution thread's 510 ticket. As a result, even though execution threads 501 to 503 have compatible interests, the message is directed to execution thread 500. Execution thread 500 in turn uses execution thread's 510 ticket to send a message only to execution thread 510.

The messaging component of the present invention may be used to allow two applications to communicate, and in so doing the applications may determine that data is to be transferred to one of the applications. When an execution thread determines that it, or another execution thread, needs data, the present invention can be used to negotiate a manner of transfer for transferring the data to the execution thread. Data may be transferred using either a direct or by-reference method. Data may be sent using a secure channel and/or by encrypting the data before it is sent.

Referring to FIG. 2, a direct connection is one in which data is to be directly transferred from one execution thread to another. For example, a direct connection may be used to send data from process 203 to thread 223. According to the present invention, a "JobStart" function of API 205 is invoked on CHE 200 and STB 220, which spawn threads 209 and 229. Since data is being transferred via a direct connection to thread 223, spawned thread 209 transfers data stored in a send buffer (e.g., buffers 207), and spawned thread 229 stores received data in a received data buffer (e.g., buffers 228). The direct connection between threads 209 and 229 may be formed using IP and a communication protocol running on IP (e.g., Transfer Control Protocol, TCP). However, it is possible to use another protocol for transporting the data (e.g., Apple-Talk).

Alternatively, data may be transferred according to the present invention using a by-reference transfer method. That is, buffered data or a reference is placed (or is already stored) on a server. Examples of servers include, but are not limited to, a Hypertext Transfer Protocol (HTTP), Hypertext Transfer Protocol Secure (HTTPS), Broadband File System (BFS), File Transfer Protocol (FTP) and File Transfer Protocol Secure (FTPS). The recipient execution thread receives a message that contains the reference of the server that contains the data, and establishes a connection with the referenced server.

Job negotiation according to the present invention allows for various protocols to be used depending on the needs of the receiving and/or sending execution threads and the resources that are available at the time. It is also possible to defer the data transfer to an idle or less busy server to perform load balancing.

Job negotiation is further used to communicate a designation for a port, which is dynamically bound to a spawned thread (e.g., thread 209 or thread 229) in order to establish a connection for transferring data. For example, job negotiation may be used to communicate a port designation associated with each of threads 209 and thread 229 to one another thereby allowing the spawned tasks to communicate to transfer data.

Once an execution thread determines that data is to be transferred, it indicates the start of a job, and none or more parameters (e.g., security, bidirectional communication, etc.) that identify requirements of the transfer, using API 205. As a result, a job component (e.g., spawned thread 209 or 229) is spawned, or activated, on the sending and recipient computing systems. The sender's job component uses the parametric information to identify a method of transfer which it will propose to the recipient's job component.

In addition, to the parametric information received from the sending application, the job component may take into account load balancing considerations. For example, the job component may decide to use a server that is not as busy as another server, if the job component determines that the less busy server satisfies the requirements for data transfer as set forth in the received parametric information.

If a direct method of transport is to be used, the job components, of the sending and receiving execution threads, exchange addressing information. If a by-reference method is to be used, the sending execution thread's job component sends a URL associated with the data transfer server, and the recipient's job component ensures that a connection can be made with the server before it accepts the proposed method of transfer.

Figure 6A:
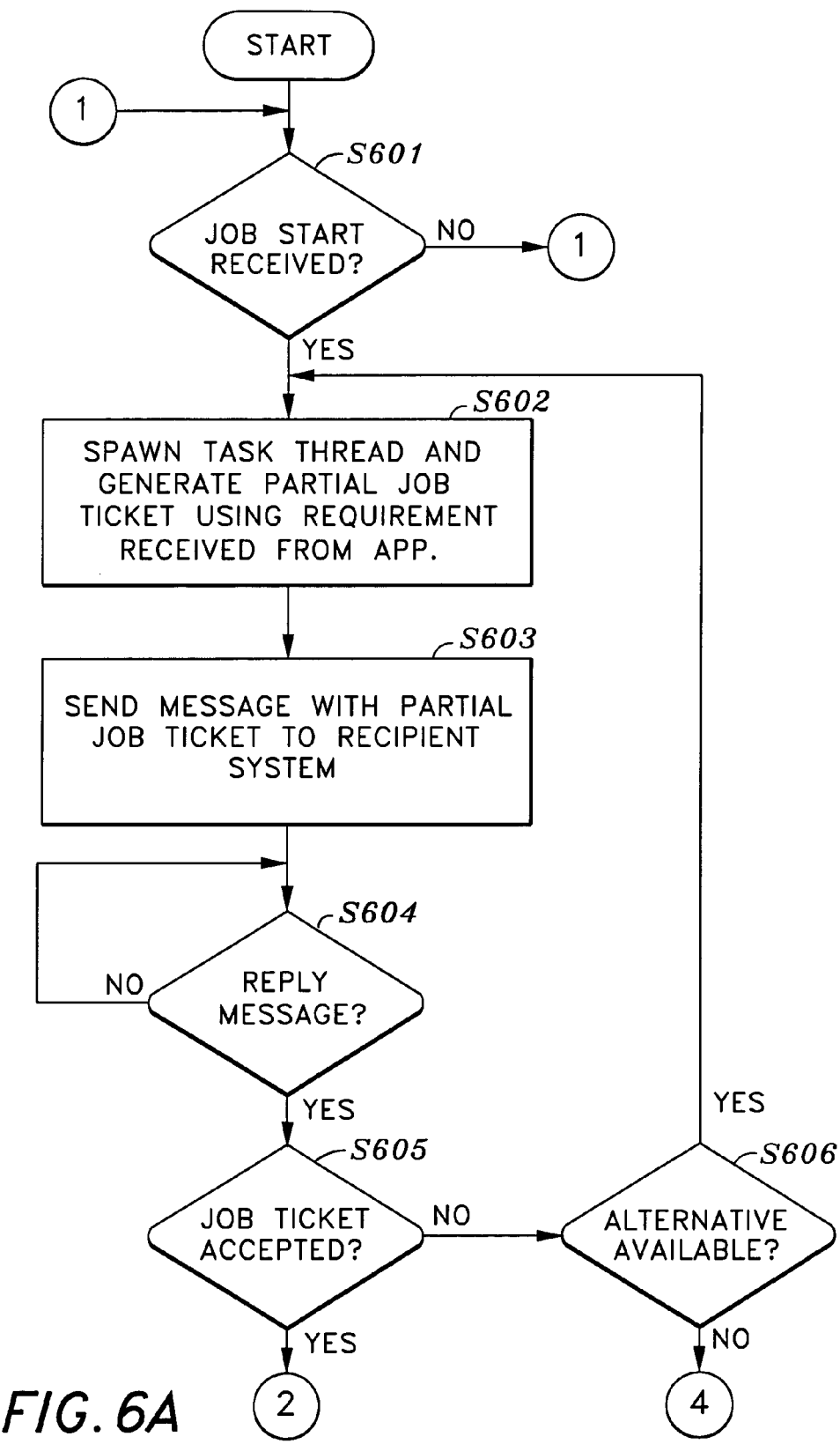
FIGS. 6A to 6C provide a flow diagram of processing steps performed on a sending computing system for transferring data according to the present invention.
Figure 6B:
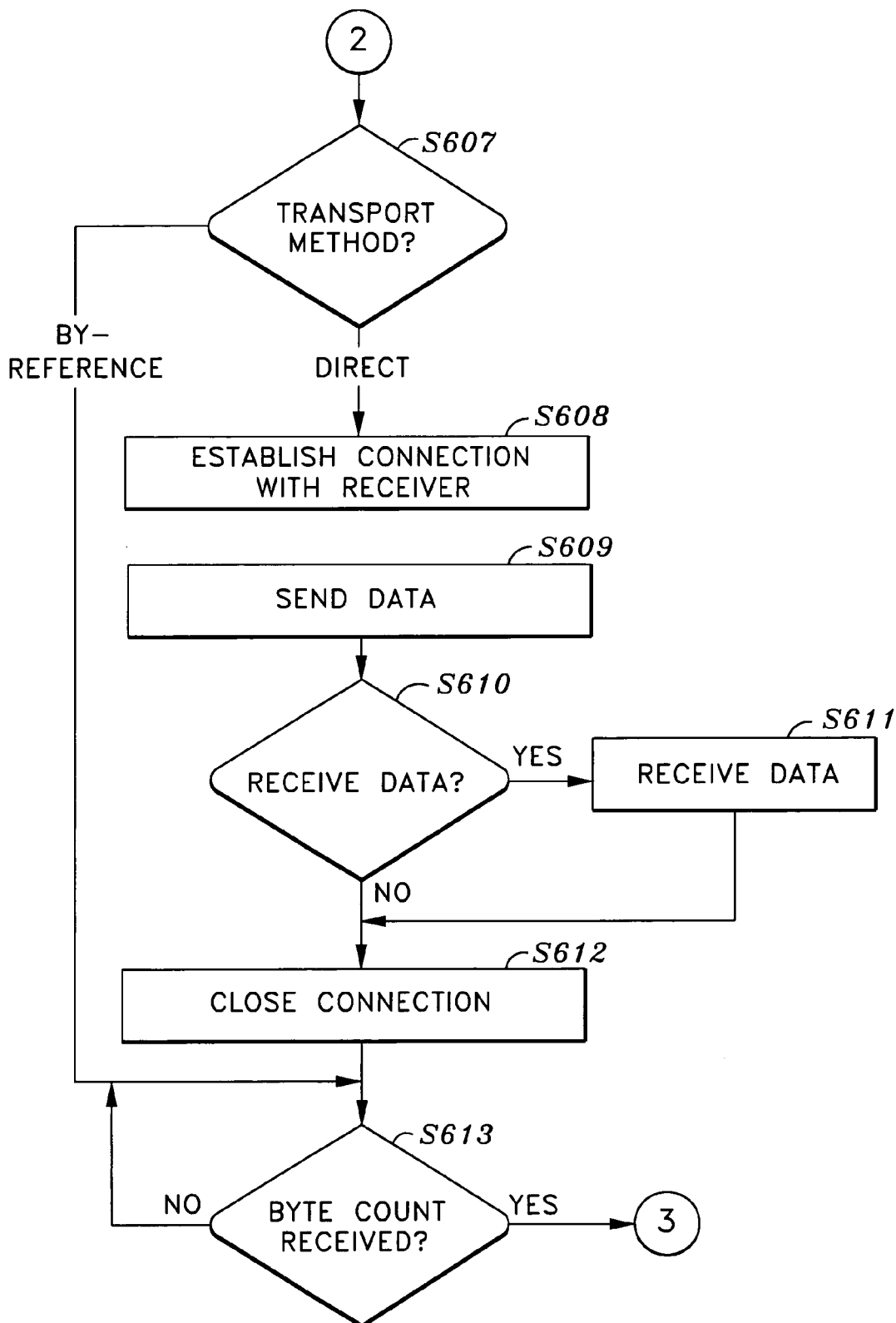
Figure 6C:
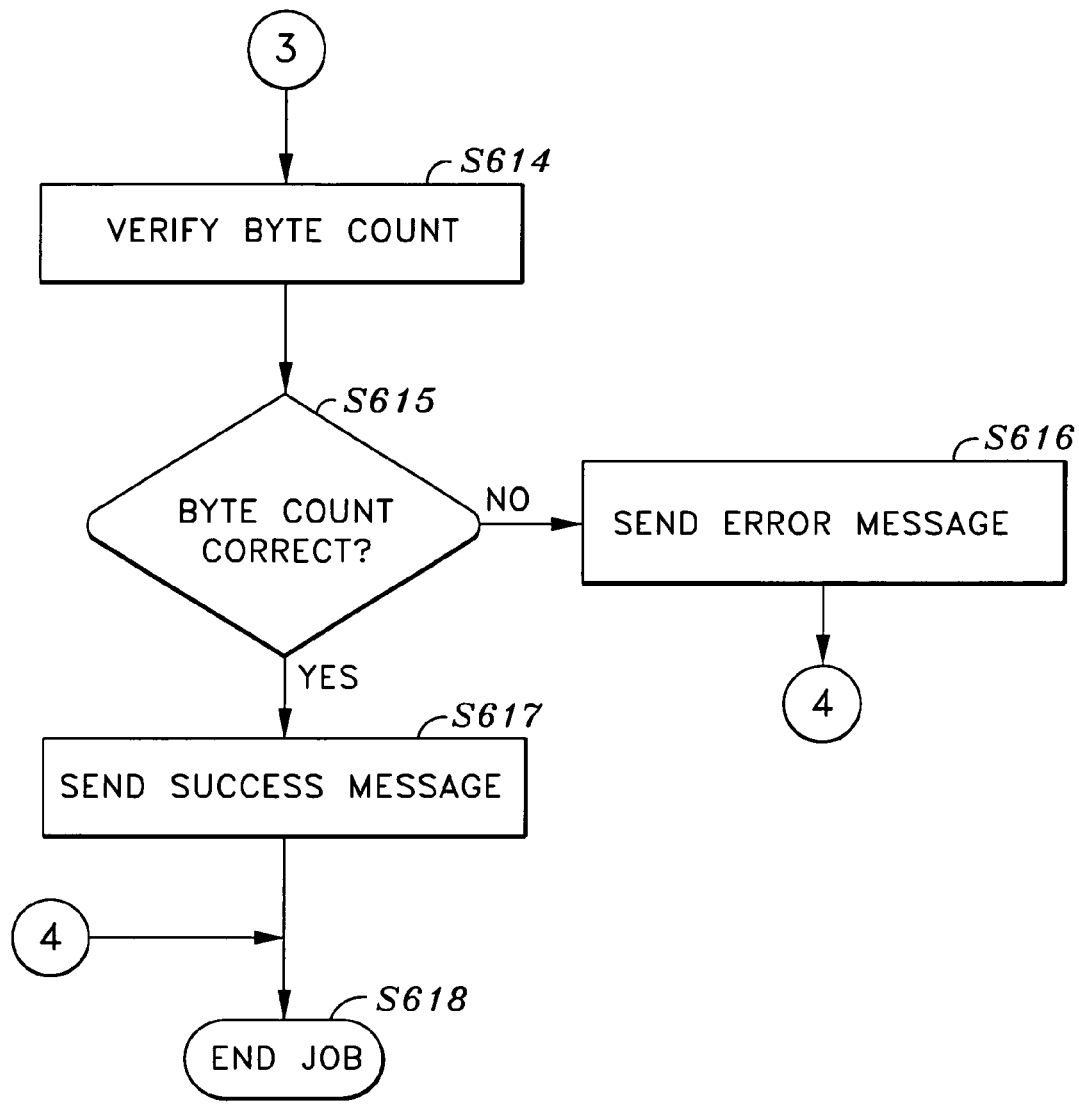

FIGS. 6A to 6C provide a flow diagram of processing steps performed on a sending computing system for transferring data according to the present invention.

Briefly, the execution threads on the sending and receiving systems invoke a "job start" function, passing the requirements for transferring data as parameters. In addition, the sender's "job start" identifies a network address of the recipient's system. As a result, the job components are activated. The sending system's job component determines a manner of transfer based on the job requirements, and generates a partial job ticket. The partial job ticket, which contains a proposed manner of transfer, is sent to the recipient's job component via its messaging component 400 and a network message. The recipient's job component registers with messaging component 400 using a pre-determined interest. The sender's message has a message type that matches the pre-determined interest.

The recipient's job component determines whether the proposed manner of transfer is acceptable. If the proposed manner of transfer is not acceptable, the sender's job component determines whether there is another available manner of transfer. If so, the sender's job component sends an alternative manner of transfer, and the recipient's job component determines whether the alternative manner of transfer is acceptable.

When a manner of transfer is agreed upon, data is transferred, and the recipient's job component sends byte count information to the sender's job component in order to detect any errors in the transfer.

Referring to FIG. 6A, at step S601, a determination is made whether or not a "job start" notification is received by the job component. The "job start" is sent to the job component via API 205, for example. If not, processing continues to wait for a "job start." If so, a job component is activated, and processing continues at step S602 to generate a partial job ticket that takes into account the requirements received from the execution thread in the job start.

If a transport method is direct, the partial ticket includes the IP address of the destination. If the method of transfer is by-reference, the partial job ticket includes a URL which identifies the location (e.g., server and filename) of the data.

At step S603, a message is sent to the recipient job component which includes the partial job ticket. The partial job ticket includes a proposed manner of transfer. The sender's job component waits at step S604 for a reply message.

When a reply message is received, processing continues at step S605 to determine whether or not the proposed manner of transfer is acceptable to the recipient's job component. If not, processing continues at step S606 to determine whether there is an alternative manner of transfer available. If not, processing ends at step S618. If an alternative is available, processing continues at step S602 to generate another partial job ticket, which is sent to the recipient's job component for evaluation.

If it is determined, at step S605, that the job ticket that is sent to the recipient's job component is acceptable, processing continues, at step S607, to begin the data transfer using information that is provided in the job ticket by the recipient's job component. For example, in the case of a direct transfer, if a proposed manner of transfer is acceptable, recipient's job component completes the job ticket with a port designation which can be used by the sender's job component to communicate directly with the receiver's job component.

At step S607, a determination is made whether the transport method, which was as part of the manner of transfer accepted by the recipient, is by-reference or direct. If it is determined that the transport method is by-reference, the sender's job component waits, at step S613, for the recipient's job component to contact the server specified by the manner of transfer, and to sends a byte count of the data transferred to the recipient's job component. Thus, if it is determined that the transport method is by-reference, the sender's job component next processes the byte count, which it receives from the recipient's job component, at step S613.

If it is determined, at step S607, that the transport method is direct, processing continues at step S608 to establish a connection (e.g., TCP connection) with the recipient's spawned thread. The data (e.g., data stored in buffers 207 or 227) is sent to the recipient using the spawned thread's socket address. The recipient's spawned thread stores the data in a buffer (e.g., buffers 208 or 228). API 205 is used to notify the receiving thread of execution (e.g., via a callback, or event queue 204 or 224) that data has been received.

If a bi-directional connection was established in step S608, it is possible for the recipient to send data to the sender using the same connection. Thus, at step S610, a determination is made whether the recipient is to receive data. If so, processing continues at step S611 to receive the data. In either case, once all of the data has been sent, processing continues at step S612 to close the connection between the sending and receiving threads.

At step S613, a determination is made whether a byte count has been received. If not, processing waits for the byte count at step S613. If a byte count has been received, processing continues at steps S614 and S615 to verify that the received byte count matches the sent byte count. If not, processing continues at step S616 to send an error message. If the byte counts match, processing continues at step S617 to send a successful completion message. The byte count and error/success messages are sent using the messaging capabilities of the present invention. Once the error/success message is sent, processing ends at step S618.

Figure 7A:
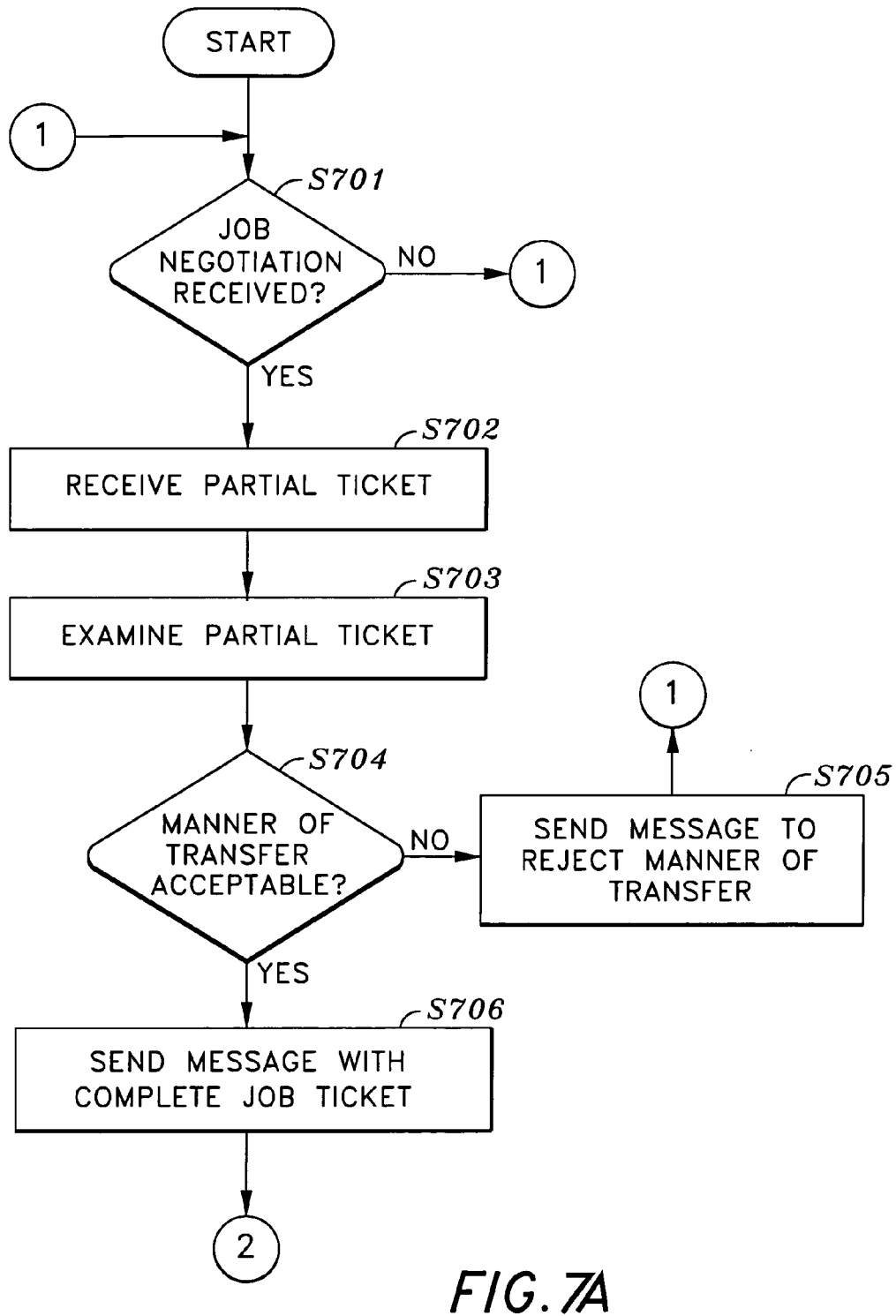
FIGS. 7A to 7C provide a flow diagram of processing steps performed on a receiving computing system for receiving data according to the present invention.
Figure 7B:
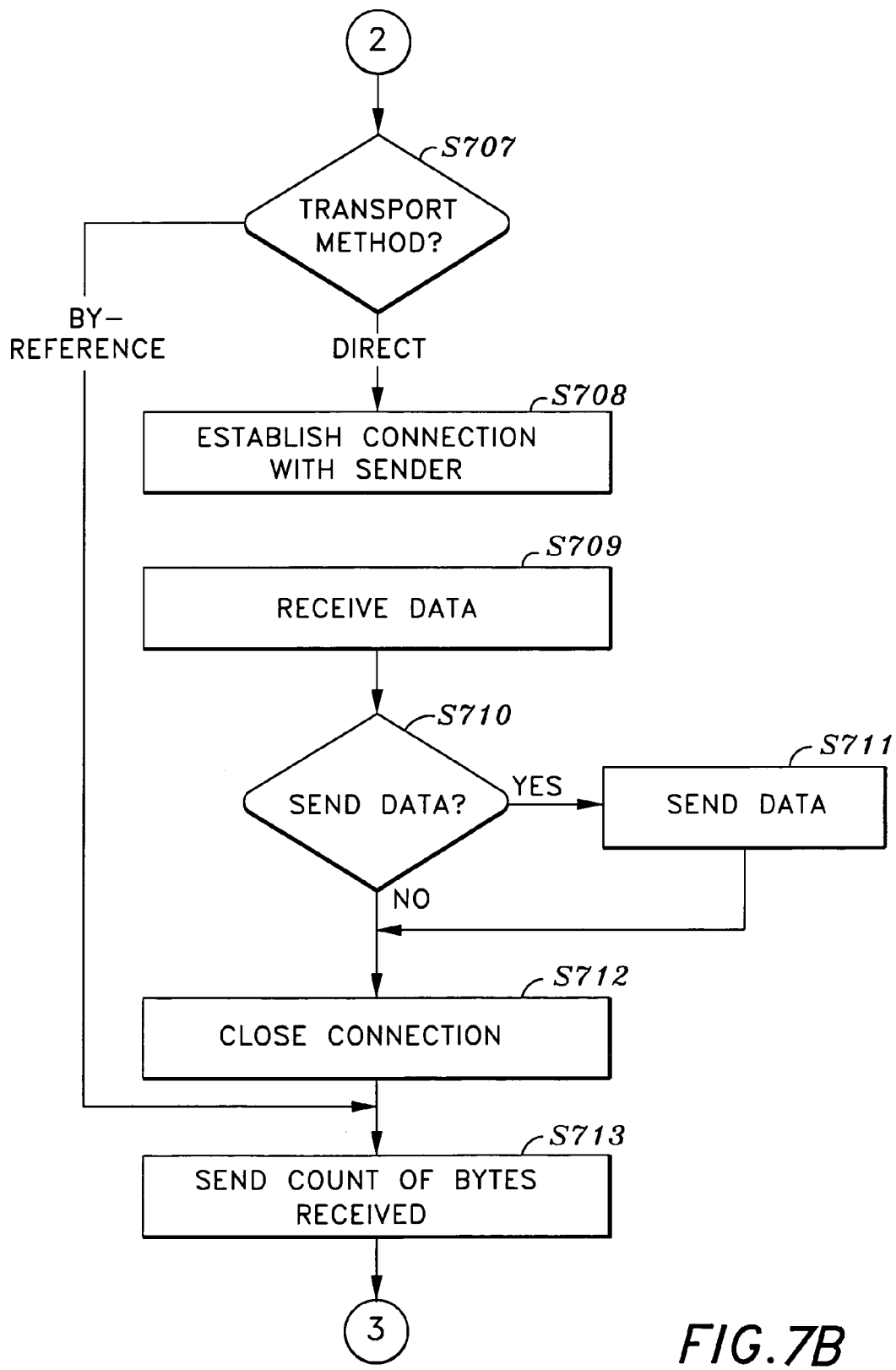
Figure 7C:
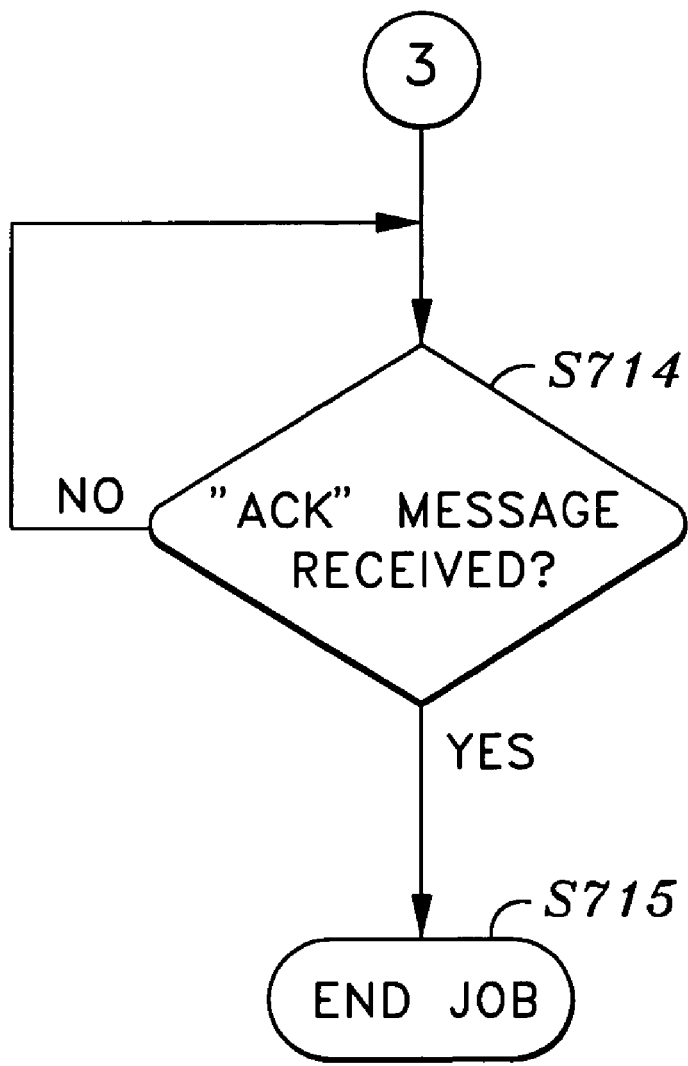

FIGS. 6A to 6C provide a flow diagram of processing steps performed on a sending computing system for transferring data according to the present invention. FIGS. 7A to 7C provide a flow diagram of processing steps performed on a receiving computing system for receiving data according to the present invention.

At step S701, a determination is made whether a job negotiation message has been received. If so, processing continues at step S702 to retrieve the partial job ticket contained therein. At step S703, the information in the partial job ticket is examined to determine whether the proposed manner of transfer is acceptable. At step S704, a determination is made whether the proposed manner of transfer is acceptable. If so, a message is sent to accept the proposed manner of transfer. As is discussed in herein, a message accepting the manner of transfer includes a completed job ticket, which includes the socket designation of a socket created by the sender's job component (e.g., thread 209 or 229), which is activated to manage the data transfer. If the proposed manner of transfer is not acceptable, a message is sent at step S705 rejecting the manner of transfer. The acceptance or rejection message is sent using the messaging component 400 and the messaging architecture described herein.

If a proposed manner of transfer is acceptable, processing continues at step S707 to prepare for the data transfer. A determination is made whether the transport method is direct or by-reference. If it is direct, processing continues at step S708 to establish a connection with the sending computing system's job component (e.g., thread 209 or 229). At step S709, the data is received over the connection and stored in one or more buffers (e.g., buffers 208 or 228). At step S710, a determination is made whether to send data to the sending computing system using the established connection. If so, processing continues at step S711 to send data. In either case, processing continues at step S712 to close the connection once the data as been transferred. At step S713, a count of the bytes received in sent to the sending computing system.

At step S714, the recipient system awaits an "ACK" message (i.e., a message indicating whether or not the transfer was successful), and the job processing ends at step S715.

Figure 8:
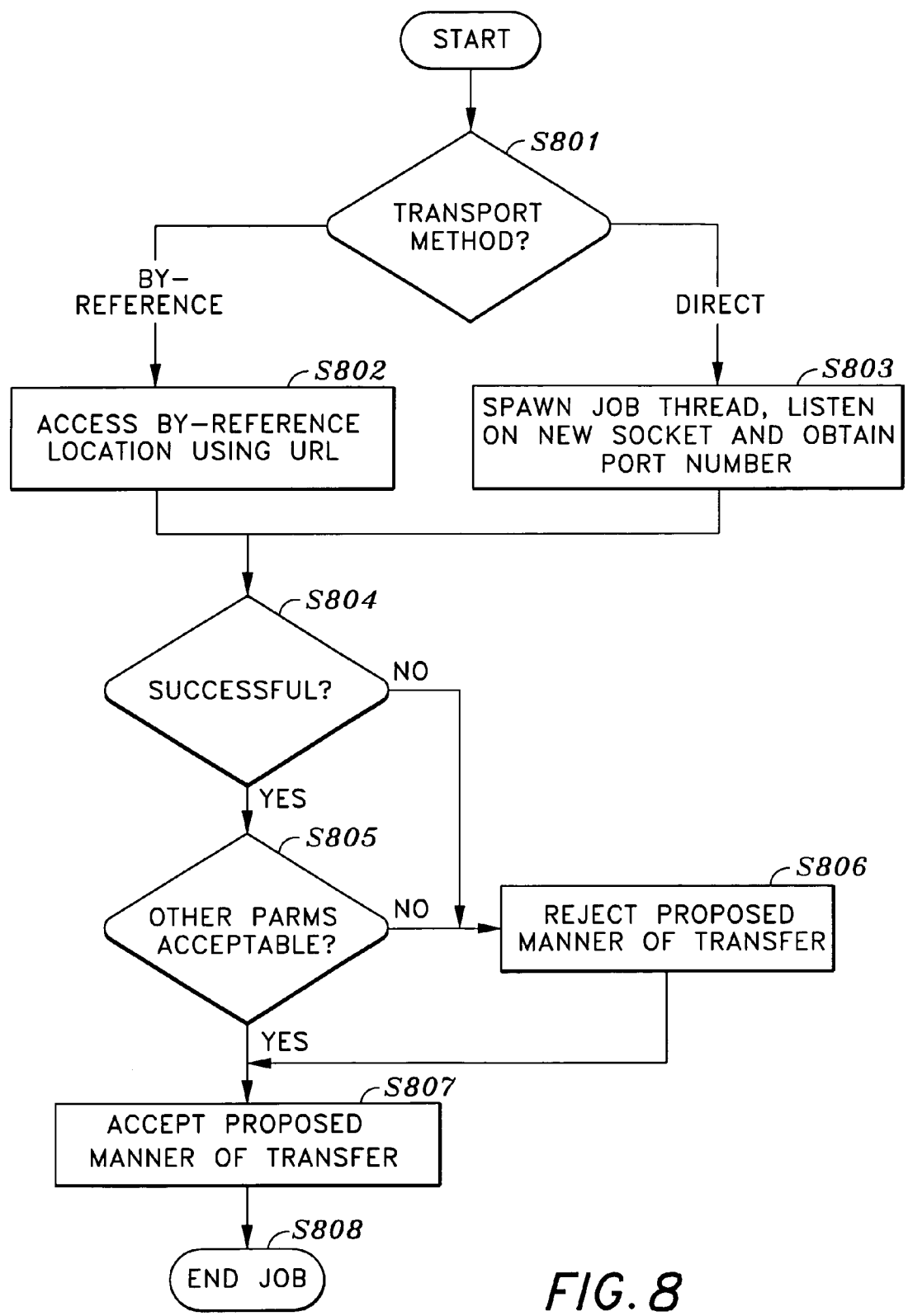
FIG. 8 provides a flow diagram of processing steps performed on a recipient computing system for determining, according to the present invention, whether a proposed manner of transfer is acceptable.

As discussed with reference to steps S703 and S704, the recipient system determines whether or not a proposed manner of transfer is acceptable. FIG. 8 provides a flow diagram of processing steps performed on a recipient computing system for determining, according to the present invention, whether a proposed manner of transfer is acceptable.

A determination of whether a proposed manner of transfer is acceptable may differ to some extent based on whether the method of transport is direct or by-reference. Thus, at step S801, the proposed method of transport is determined based on the partial ticket information. If it is determined that the method of transport is by-reference, processing continues at step S802 to attempt to access the server specified by a URL included in the partial ticket information. The URL identifies a server from which the data is to be transferred. If the method of transport is direct, processing continues at step S803 to spawn a thread (e.g., thread 209 or 229), create a socket, bind the socket to a port and attempt to listen on the new socket associated with the spawned thread.

At step S804, a determination is made whether testing of the proposed transport method was successful. If not, processing continues at step S806 to reject the proposed manner of transfer. If the testing was successful, processing continues to step S805 to review any parameters (e.g., encryption) for transfer included in the proposed manner of transfer. If the transport method and each of the none or more parameters are found to be acceptable, processing continues at step S807 to send a message which accepts the proposed manner of transfer. Processing of the proposed manner of transfer ends at step S808.

Figure 9A:
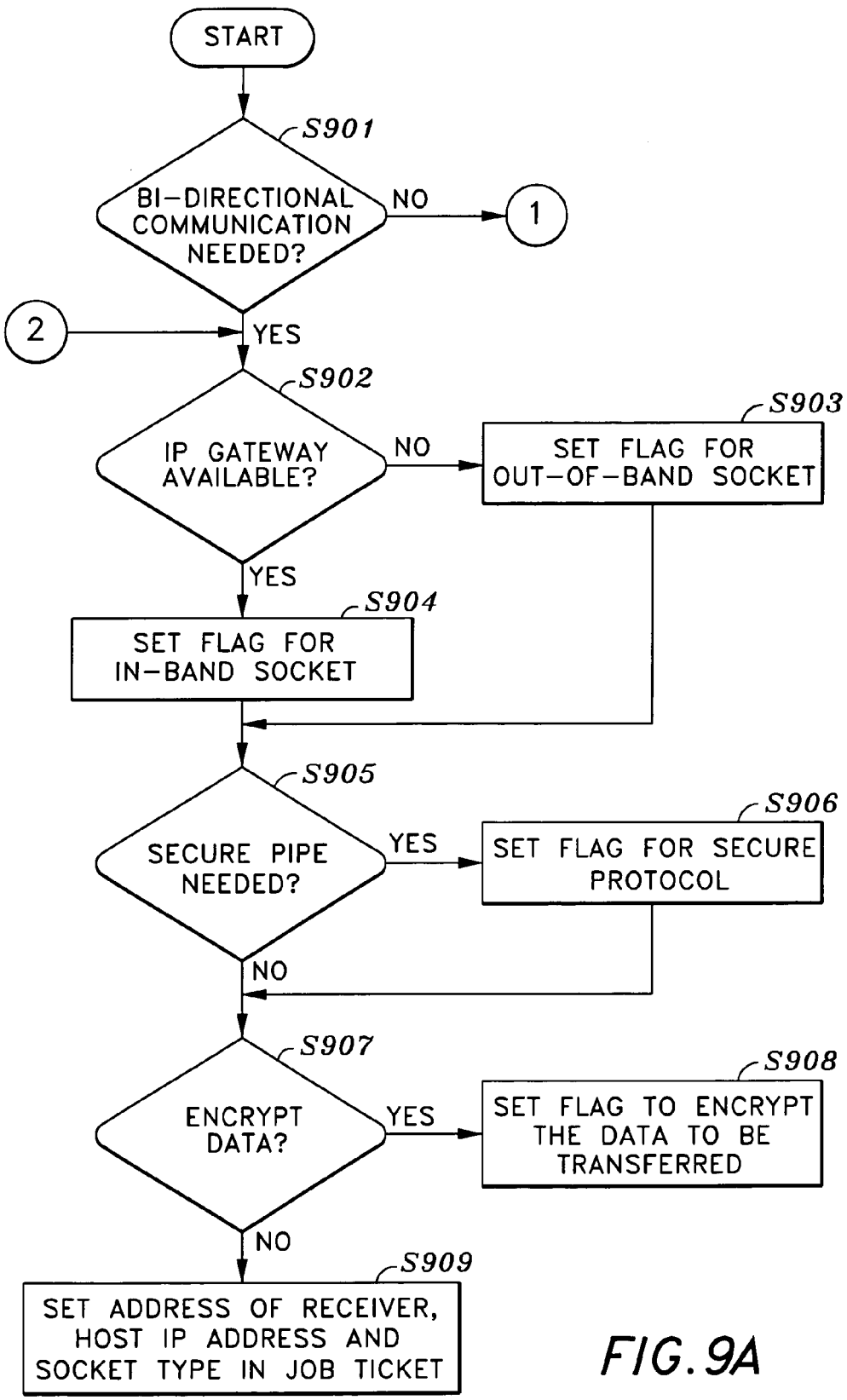
FIG. 9 provides a flow diagram of processing steps performed on a sending computing system for determining, according to the present invention, a proposed manner of transfer.
Figure 9B:
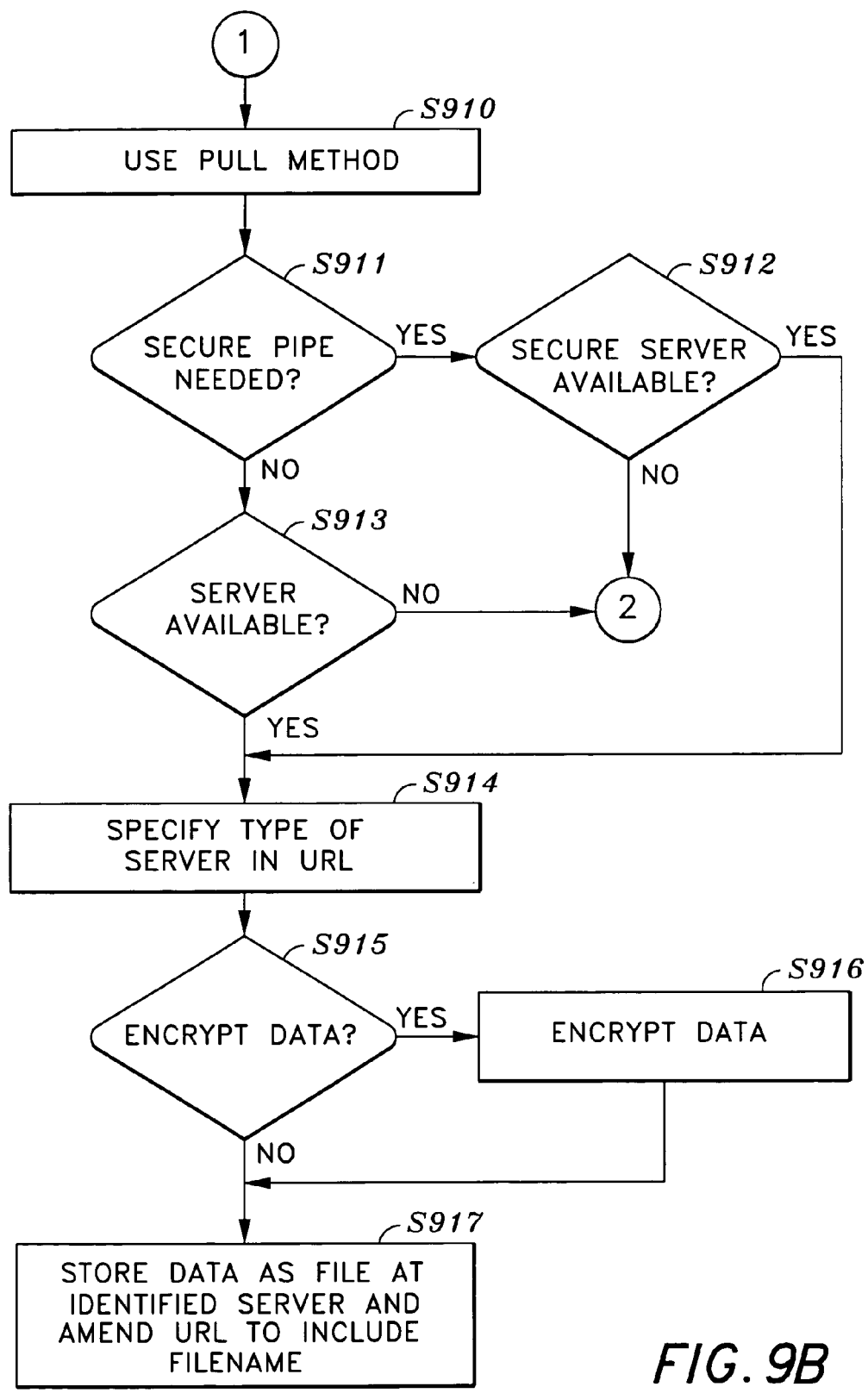

The proposed manner of transfer, that is either accepted or rejected by the recipient system, is determined by the sending system. FIG. 9 provides a flow diagram of processing steps performed on a sending computing system for determining, according to the present invention, a proposed manner of transfer. Briefly, the sending system's job component generates a partial job ticket based on the requirements specified in the "job start", and can take into account other factors such as load balancing.

At step S901, a determination is made whether the job requirements provided in the "job start" necessitated bi-directional communication. If not, processing continues at step S910 described below.

If it is determined, at step S901, to use bi-directional communication, processing continues at step S902 to use a direct (or push) method of transport. At step S902, a determination is made whether an IP gateway is available. If not, processing continues to set a flag, in the partial job ticket, to use out-of-band socket communication. If an IP gateway is available, processing continues at step S904 to set a flag, in the partial job ticket, to use in-band socket communication.

In either case, processing continues at step S905 to determine whether a secure pipe (e.g., the Secure Socket Layer available in HTTPS) is needed based on the job requirements. If so, processing continues at step S906 to set a flag, in the partial job ticket, to use a secure protocol, and processing continues at step S907. If a secure pipe is not required, processing continues at step S907.

At step S907, a determination is made, based on the job requirements, whether the data is to be encrypted. If so, processing continues at step S908 to set a flag, in the partial job ticket, to encrypt the data that is to be transferred, and processing continues at step S909. If it is not necessary to encrypt the data to be transferred, processing continues at step S909.

Thus, according to the present invention, it is possible to both encrypt the pipe in which the data is to be sent, and to encrypt the data. Encrypted data may be stored in shared memory, and decrypted by the recipient execution thread. Thus, shared memory may be used to store transfer data without compromising the data.

At step S909, a network address of the receiver is set in the partial job ticket along with sending computing system's network (IP) address and socket type.

If it is determined, at step S901, not to use bi-directional communication, processing continues at step S910 to use a by-reference (or pull) method of transport. At step S911, a determination is made whether a secure pipe is needed (e.g., a server configured to communicate using HTTPS). If not, processing continues at step S913 to determine whether a server is available to transfer the data. If it is determined, at step S911, that a secure pipe is needed, processing continues at step S912 to determine whether or not a secure server is available. In making the determinations in steps S912 and 913, a load associated with each server may be examined to determine whether a server is "available".

If an available server is found, processing continues at step S914 to specify the server type (e.g., HTTP, HTTPS, FTP, FTPS, etc.) in the partial job ticket. At step S915, a determination is made whether the data is to be encrypted. If so, processing continues at step S916 to encrypt the data that is to be transferred. Processing continues at step S917 to store the data, encrypted or not, on the identified server and amend the URL in the partial job ticket to include the filename that contains the data.

As described above, a network message structure is wrapped around a message of the present invention, and a message is part of the payload of the network message. The network message wrapping may be based on the UDP structure, which runs on top of IP. The following provides an example of a UDP message structure that includes a message of the present invention as part of the payload of the UDP message:

| Name | Description |
| --- | --- |
| UDP_Header: | Network message's header. |
| Type | Indicates whether the message is a new message or an "ACK" message. |
| Msg_ID | Type of Pass-Thru message for pass-through messaging. |
| Transaction_ID | Identifier unique to the system and all messages sent (e.g., the count of the message sent by the computing system). |
| UDP_Payload: | Network message payload. |
| Messaging_Header | Described below. |
| ACK_Port | The socket used to send the message is not necessarily the socket to receive an "ACK" message. This field specifies the port to which an "ACK" message is to be sent. |

| Name | Description |
| --- | --- |
| Payload_Len | Number of bytes of the payload. |
| Payload | Message for none or more execution threads. |

The messaging_header portion of the UDP message's payload identifies an application name and a message type. The following table provides a structure for the messaging_header:

| Name | Description |
| --- | --- |
| Version | Identifies version of messaging implementation. Both the sending and receiving entities should be of the same version. |
| Protocol_ID | Identifies the protocol that is used. |
| App_Name | The name of the application (e.g., "AppA". |
| STB_Mac_Addr | The MAC address of the STB. |
| STB_IP_Addr | The IP address of the STB |
| Msg_Type | Value compared with registered interests to identify intended recipients. |
| Ticket_1 | Ticket of a thread of execution (e.g., either sender or receiver). |
| Ticket_2 | Ticket of the other execution thread. |
| Msg_Length | Size of payload of message. |
| Options | Options such as security option (e.g., encryption). |
| Reserved | Reserved for future/customized use. |
| Payload | Message. |

The ticket_1 and ticket_2 fields in the above structure may be used to store the tickets of a sending and receiving thread of execution. The following provides an example of a ticket structure that may be used with the present invention:

| Name | Description |
| --- | --- |
| Thread_1_Handle | Job handle associated with a either the sender or recipient execution thread. |
| Thread_2_Handle | Job handle associated with the other thread of execution not specified by Thread_1_Handle. |
| Delivery_type | Direct or By Reference. |
| Method | Method of Transport (e.g., TCP/IP, BFS, FTP, FTPS, HTTP, HTTPS, etc.) |
| URL | method://address:port or method://address:port(/path/filename). For a direct TCP connection, the sender will fill in the IP address of the destination and the destination will fill in the port number to which the sender should connect. |
| Job_Size | Size of the job. |
| Job_Options | Bitmask of the options required by the job. |
| Key | Encryption key that is to be used. |

The following table provides an example of functions of an API (e.g., API 205) which is used for communication between an execution thread and a messaging component

| | Description |
| --- | --- |
| Function | |
| Init | Initialized messaging session for caller. Allocates resources (e.g., default event queue) for use by caller (e.g., application) for messaging using the messaging component. Returns handle associated with caller, and increments handle count, which represents number of open messaging sessions. |
| Terminate | Signals caller's desire to terminate messaging session. Decrements handle count. If no other handle instance and no active job, free resources. |
| MsgSend | Queues a message for sending, and spawns message send task to send the queued message, if not already running;. Returns an identifier of the message used by the messaging component, or an error. Results in an outcome event that indicates whether or not the message was successfully sent. |
| Name | |
| MsgRegister | Registers/De-registers an interest associated with the caller, and an event queue for an event signaling receipt of a message of interest. Uses the caller's ticket to associate interest with caller. |
| MsgGet | Used to retrieve a message received by the messaging component. Returns a pointer to a message data structure, the pointer corresponding to a message ID associated with the message; Also used to signal caller's desire to free the message. When a "free" operation has been received from all of the recipients of the message, this function is used to free the message. |
| MsgTicketGet | Used to set a ticket in a message structure to restrict future delivery of a message to a recipient having the ticket. |
| JobStart | Signals the start of a job. A job start may be either a "send" or a "receive" type. A "send" directs the job component to initiate the job (and a TCP connect will be issued), and a "receive" type directs the job component to wait for the job (and a TCP listen will be issued). A receive call back parameter. A recvcallback parameter identifies the callback that is called if data is received and a sendcallback parameter is used to identify a callback that is called when the buffer or reference has been sent. |
| JobEnd | Signals the completion of a job. |
| JobListen | Posts one or more buffers to be used to receive data. Data that is read from the network will be stored in a posted buffer. |
| JobSend | Queues one or more buffers to be sent to recipient(s). |

-continued

| | Description |
|---|---|
| JobSendRef | Provides reference (e.g., path and file name) of a file that is to be sent to one or more recipients. |
| JobSetKey | Sets encryption keys (e.g., public and/or private keys) for secure jobs. |
| JobTicketValidate | Validates a ticket before it is passed to JobStart. |

In this regard, the invention has been described with respect to particular illustrative embodiments. However, it is to be understood that the invention is not limited to the above-described embodiments and that various changes and modifications may be made by those of ordinary skill in the art without departing from the spirit and the scope of the invention.

What is claimed is:

1. A method for transferring job data in a digital cable network system wherein the digital cable network system includes a sending component and a receiving component which communicate over the network, the method comprising:

determining, at the sending component, a manner of transfer which is selected from a group consisting of all of (i) a referential transfer using a secure pipe, (ii) a referential transfer not using a secure pipe, (iii) a direct transfer using a secure pipe, and (iv) a direct transfer not using a secure pipe, wherein, in the referential transfer, the sending component uploads the job data to a predetermined location on a secure server, and the sending component sends location information corresponding to the secure server to the receiving component, and the uploaded job data is received by the receiving component from the predetermined location on the secure server, wherein the uploaded job data is received in accordance with a request which includes the location information from the receiving component;

transferring, from the sending component to the receiving component, a message which includes the determination result of the determining step;

uploading the job data from the sending component to a predetermined location on a secure server, responsive to a determination of the determining step that the manner of transfer is (i) a referential transfer using a secure pipe or (ii) a referential transfer not using a secure pipe;

transferring the job data from the sending component to die receiving component via direct communication responsive to a determination of the determining step that the manner of transfer is (iii) a direct transfer using a secure pipe or (iv) a direct transfer not using a secure pipe;

wherein when the determining step determines that the manner of transfer is (i) a referential transfer using a secure pipe or (iii) a direct transfer using a secure pipe, said transferring step and said uploading step control communication by using a secure socket layer protocol; and wherein the job data uploaded by the uploading step is received by the receiving component in accordance with the request from the receiving component when the manner of transfer is determined (i) or (ii) in which the referential transfer is used.

2. The method according to claim 1, wherein said uploading step further encrypts the data itself before uploading via a secure socket layer.

3. A sending component operating in a cable head end (CHE) which communicates over a network to transfer job data to a receiving component operating in a set top box (STB) in a digital cable network system, comprising:

a determining unit constructed to determine, at the sending component, a manner of transfer which is selected from a group consisting of all of (i) a referential transfer using a secure pipe, (ii) a referential transfer not using a secure pipe, (iii) a direct transfer using a secure pipe, and (iv) a direct transfer not using a secure pipe, wherein, in the referential transfer, the sending component uploads the job data to a predetermined location on a secure server, and the sending component sends location information corresponding to the secure server to the receiving component, and the uploaded job data is received by the receiving component from the predetermined location on the secure server, wherein the uploaded job data is received in accordance with a request which includes the location information from the receiving component;

a transferring unit constructed to transfer, from the sending component to the receiving component, a message which includes the determination result;

an uploading unit constructed to upload the job data from the sending component to a predetermined location on a secure server, responsive to a determination of the determining unit that the manner of transfer is (i) a referential transfer using a secure pipe or (ii) a referential transfer not using a secure pipe;

transferring unit constructed to transfer the job data from the sending component to the receiving component via direct communication responsive to a determination of the determining unit that the manner of transfer is (iii) a direct transfer using a secure pipe or (iv) a direct transfer not using a secure pipe;

wherein when the determining unit determines that the manner of transfer is (i) a referential transfer using a secure pipe or (iii) a direct transfer using a secure pipe, said transferring unit and said uploading unit control communication by using a secure socket layer protocol; and wherein the job data uploaded by the uploading unit is received by the receiving component in accordance with the request from the receiving component when the manner of transfer is determined (i) or (ii) in which the referential transfer is used.

4. The apparatus according to claim 3, wherein said uploading unit further encrypts the data itself before uploading via a secure socket layer.

5. A computer-readable storage memory medium having computer-executable process steps stored thereon for transferring job data in a digital cable network system, wherein the digital cable network system includes a sending component and a receiving component which communicate over the network, wherein said process steps comprise:

a determining step to determine, at the sending component, a manner of transfer which is selected from a group consisting of all of (i) a referential transfer using a secure pipe, (ii) a referential transfer not using a secure pipe, (iii) a direct transfer using a secure pipe, and (iv) a direct transfer not using a secure pipe, wherein, in the referential transfer, the sending component uploads the job data to a predetermined location on a secure server, and the sending component sends location information corresponding to the secure server to the receiving component, and the uploaded job data is received by the receiving component from the predetermined location on the secure server, wherein the uploaded job data is received in accordance with a request which includes the location information from the receiving component;

a transferring step to transfer, from the sending component to the receiving component, a message which includes the determination result of the determining step;

an uploading step to upload the job data from the sending component to a predetermined location on a secure server, responsive to a determination of the determining step that the manner of transfer is (i) a referential transfer using a secure pipe or (ii) a referential transfer not using a secure pipe; and a transferring step to transfer the job data from the sending component to the receiving component via direct communication responsive to a determination of the determining step that the manner of transfer is (iii) a direct transfer using a secure pipe or (iv) a direct transfer not using a secure pipe;

wherein when the determining step determines that the manner of transfer is (i) a referential transfer using a secure pipe or (iii) a direct transfer using a secure pipe, said transferring step and said uploading step control communication by using a secure socket layer protocol; and wherein the job data uploaded by the uploading step is received by the receiving component in accordance with the request from the receiving component when the manner of transfer is determined (i) or (ii) in which the referential transfer is used.

6. A sending component operating in a set top box (STB) which communicates over a network to transfer job data to a receiving component operating in a cable head end (CHE) in a digital cable network system, comprising:

a determining unit constructed to determine, at the sending component, a manner of transfer which is selected from a group consisting of all of (i) a referential transfer using a secure pipe, (ii) a referential transfer not using a secure pipe, (iii) a direct transfer using a secure pipe, and (iv) a direct transfer not using a secure pipe, wherein, in the referential transfer, the sending component uploads the job data to a predetermined location on a secure server, and the sending component sends location information corresponding to the secure server to the receiving component, and the uploaded job data is received by the receiving component from the predetermined location on the secure server, wherein the uploaded job data is received in accordance with a request which includes the location information from the receiving component;

a transferring unit constructed to transfer, from the sending component to the receiving component, a message which includes the determination result;

an uploading unit constructed to upload the job data from the sending component to a predetermined location on a secure server, responsive to a determination of the determining unit that the manner of transfer is (i) a referential transfer using a secure pipe or (ii) a referential transfer not using a secure pipe;

transferring unit constructed to transfer the job data from the sending component to the receiving component via direct communication responsive to a determination of the determining unit that the manner of transfer is (iii) a direct transfer using a secure pipe or (iv) a direct transfer not using a secure pipe;

wherein when the determining unit determines that the manner of transfer is (i) a referential transfer using a secure pipe or (iii) a direct transfer using a secure pipe, said transferring unit and said uploading unit control communication by using a secure socket layer protocol; and wherein the job data uploaded by the uploading unit is received by the receiving component in accordance with the request from the receiving component when the manner of transfer is determined (i) or (ii) in which the referential transfer is used.

7. The apparatus according to claim 6, wherein said uploading unit further encrypts the data itself before uploading via a secure socket layer.

* * * * *